(12) United States Patent
Phillips

(10) Patent No.: US 12,553,001 B2
(45) Date of Patent: Feb. 17, 2026

(54) DEOILING PROCESS

(71) Applicant: ExxonMobil Technology and Engineering Company, Annandale, NJ (US)

(72) Inventor: Gaither M. Phillips, Spring, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 239 days.

(21) Appl. No.: 17/756,333

(22) PCT Filed: Nov. 13, 2020

(86) PCT No.: PCT/US2020/060358
§ 371 (c)(1),
(2) Date: May 23, 2022

(87) PCT Pub. No.: WO2021/108144
PCT Pub. Date: Jun. 3, 2021

(65) Prior Publication Data
US 2023/0014244 A1     Jan. 19, 2023

(51) Int. Cl.
*C10G 73/36*     (2006.01)
*C10G 73/44*     (2006.01)

(52) U.S. Cl.
CPC ............ *C10G 73/36* (2013.01); *C10G 73/44* (2013.01)

(58) Field of Classification Search
CPC ........ C10G 73/06; C10G 73/10; C10G 73/12; C10G 73/32; C10G 73/36; C10G 73/44
See application file for complete search history.

(56) References Cited

U.S. PATENT DOCUMENTS

| | | | |
|---|---|---|---|
| 2,748,056 A | | 5/1956 | Backlund et al. |
| 3,232,862 A | * | 2/1966 | Bentley ............. C10G 73/44 208/30 |

(Continued)

OTHER PUBLICATIONS

Meyer, G., "Thermal Properties of Micro-crystalline Waxes in Dependence On the Degree of Deoiling", SOFW Journal, International Journal for Applied Science, Aug. 31, 2009 (Aug. 31, 2009), 135, pp. 43-50, XP055772737.

(Continued)

*Primary Examiner* — Renee Robinson
(74) *Attorney, Agent, or Firm* — C. Tumey Law Group PLLC

(57) ABSTRACT

The present disclosure generally relates to methods for deoiling a hydrocarbon feed and to products formed therefrom. In an embodiment is provided a method of deoiling a feed that includes introducing a waxy feed and a deoiling solvent to a dilution chilling zone; mixing the waxy feed and the deoiling solvent in the dilution chilling zone at a temperature of from about 10° F. to about 30° F. to form a slurry; introducing the slurry to a filter zone, the filter zone comprising one or more filter stages, wherein a temperature of the slurry is from about 40° F. to about 75° F.; separating the wax from the oil and the deoiling solvent to form a wax cake in a first filter stage; and washing the wax cake in the first filter stage with the deoiling solvent to obtain a composition comprising a wax. In another embodiment is provided a composition comprising a wax.

26 Claims, 2 Drawing Sheets

(56) References Cited

U.S. PATENT DOCUMENTS

| | | | |
|---|---|---|---|
| 3,644,195 A | | 2/1972 | Gudelis et al. |
| 4,013,542 A | * | 3/1977 | Gudelis ................. C10G 73/32 208/33 |
| 4,375,403 A | * | 3/1983 | Harrison ................ C10G 73/06 208/33 |
| 5,098,684 A | | 3/1992 | Kresge et al. |
| 5,227,353 A | | 7/1993 | Apelian et al. |
| 5,264,641 A | | 11/1993 | Borghard et al. |
| 5,573,657 A | | 11/1996 | Degnan et al. |

OTHER PUBLICATIONS

PCT/US2020/060358 International Search Report and Written Opinion dated Feb. 15, 2021.

* cited by examiner

DEOILING PROCESS

CROSS-REFERENCE TO RELATED APPLICATIONS

This application is the 35 USC § 371 National Stage Application for PCT Application Number PCT/US2020/060358 filed on Nov. 13, 2020 which claims the benefit of U.S. Provisional Application No. 62/940,400 filed on Nov. 26, 2019, the entire contents of both of which are incorporated herein by reference.

FIELD

The present disclosure generally relates to methods for deoiling a hydrocarbon feed and wax products produced by the methods.

BACKGROUND

Waxes are used in various applications such as candles, food coatings, adhesives, water-repellant agents for wood, rubbers. Raw wax is produced from starting materials which may be of petrochemical origin such as those produced by the Fischer-Tropsch hydrocarbon synthesis process and those derived as a byproduct from crude oil refineries by dewaxing of a lubrication oil fraction such as slack wax. These raw waxes can be mostly long-chain paraffins for slack waxes and may include a broad range of chain lengths of hydrocarbons ranging from about 20 carbon atoms to about 70 carbon atoms. Such raw waxes are conventionally distilled into narrower fractions providing wax products to match specifications, e.g., oil content, melting point, and color for end-use applications.

Feeds of oily wax, e.g., slack wax and Fischer-Tropsch wax, can also be recrystallized prior to a solvent wash to produce a refined wax that is either lower in oil content, higher in melting point, lower in needle penetration, or all of the above. Conventional methods of recrystallization use scraped surface chillers and/or warm-up deoiling of the wax.

Conventional methods of recrystallization produce inferior crystals such that the filtration rate of the slurry is adversely affected and the amount of solvent necessary to produce a fully refined wax is higher than that produced by the dilution chilling method. The scraped surface chillers themselves add an additional element of cost, e.g., maintenance and/or capital, and increase the unreliability of a manufacturing facility.

SUMMARY

The present disclosure generally relates to methods for deoiling a hydrocarbon feed and to wax products produced by the methods.

In an embodiment, the present invention provides a method of deoiling a feed that includes introducing a waxy feed and a deoiling solvent to a dilution chilling zone, the waxy feed comprising 70 wt % wax or more and an oil, when determined by using ASTM D721; mixing the waxy feed and the deoiling solvent in the dilution chilling zone at a temperature of from about 10° F. (−12° C.) to about 30° F. (−1° C.) to form a slurry; introducing the slurry to a filter zone, the filter zone comprising one or more filter stages, wherein a temperature of the slurry is from about 40° F. (4.5° C.) to about 75° F. (24° C.); separating the wax from the oil and the deoiling solvent to form a wax cake in a first filter stage; and washing the wax cake in the first filter stage with the deoiling solvent to obtain a composition comprising a wax.

In another embodiment is provided a method of deoiling a feed that includes dewaxing a feed, comprising: introducing a feed and a dewaxing solvent to a first dilution chilling zone; and forming a waxy feed; introducing the waxy feed and a deoiling solvent to a second dilution chilling zone, the waxy feed comprising a wax and an oil; mixing the waxy feed and the deoiling solvent in the second dilution chilling zone at a temperature of from about 10° F. (−12° C.) to about 30° F. (−1° C.) to form a slurry; introducing the slurry to a filter zone, the filter zone comprising one or more filter stages, wherein a temperature of the slurry is from about 40° F. (4.5° C.) to about 75° F. (24° C.); separating the wax from the oil and the deoiling solvent to form a wax cake in a first filter stage; and washing the wax cake in the first filter stage with the deoiling solvent to obtain a composition comprising a wax.

In another embodiment is provided a composition that includes a wax having one or more of the following characteristics: a congealing point (ASTM D87 (for lower melt waxes), ASTM D938 (for higher melt waxes)) of from about 40° C. to about 90° C.; a needle penetration (25° C., ASTM D1321) of from about 10 dmm to about 150 dmm; or a density (60° F., ASTM D1298) of from about 0.75 g/cm$^3$ to about 0.9 g/cm$^3$.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
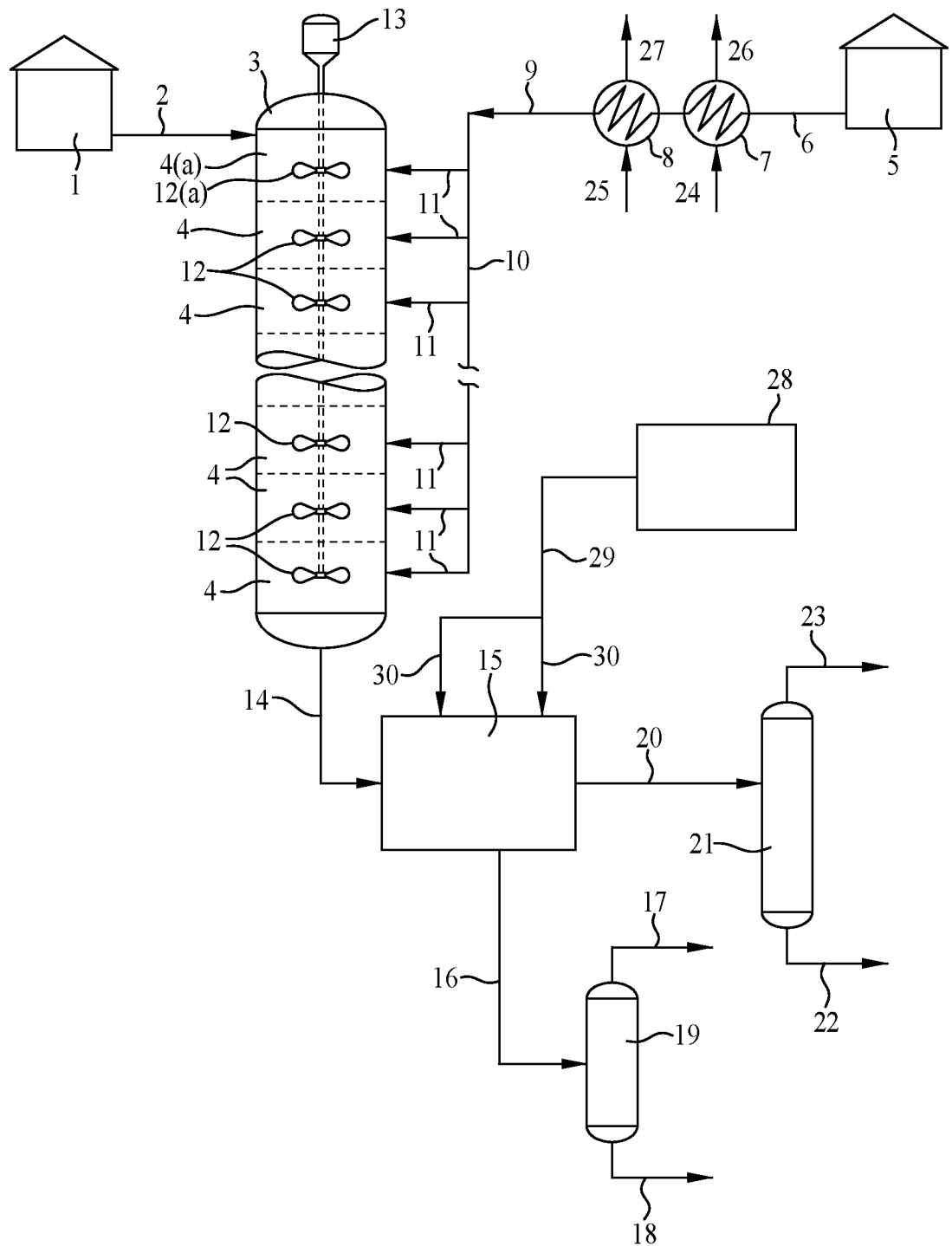
FIG. 1 is a flow diagram of a deoiling process according to at least one embodiment of the present disclosure.

The present disclosure generally relates to methods for deoiling a hydrocarbon feed and to wax products produced by the methods. The inventors have discovered new and improved processes that, at least, unexpectedly reduce the cost to produce waxes. The inventors surprisingly found that, at least, the processes described herein enable lower solvent usage and higher filtration rates than traditional deoiling processes.

The processes described herein can enable, at least, improved filtration rates, improved wax crystals, decreased operating costs due to lower solvent usage and increased amounts of wax product over conventional processes. Additionally, the methods described herein can eliminate the use of warm-up deoiling and/or scraped surface chilling equipment while providing significantly improved wax crystals over conventional methods that use such equipment.

Processes described herein can include recrystallizing the wax from the feed in a cooling tower to form a wax slurry and separating by, e.g., a filter, the wax from the wax slurry that exits the cooling tower. The recrystallization process to which the feed (such as a lubricating oil fraction) is presented to can be a solvent deoiling process, in which a chilled deoiling solvent is mixed with the lubricating oil fraction and the mixture slowly cooled, under conditions of agitation, down to a desired filtration temperature.

The processes described herein can produce higher filtration rates of a wax slurry than conventional methods. Although all stages of filtration benefit from the effect of superior crystal formation, it is most evident when measuring the normalized filtration rate of the first stage. The first stage of filtration is the first row of filters that the wax slurry exiting the cooling towers is presented to and filtered by. The increase in filtration rate (first stage and total filter area) can be advantageously utilized as it provides an increase in overall wax capacity of a manufacturing site for a given amount of filtration area. The processes described herein also can have significantly improved solvent use efficiency over conventional methods. The solvent use efficiency can be measured by the ratio of solvent needed to produce a fully refined wax to the overall feed to the manufacturing unit (bbls of solvent/bbls of feed). The feed filtration rate includes the total plant filter area—which includes one or more stages of filtration—and is a measure of the total feed to the manufacturing unit divided by the total amount of filter area used (barrel/day/ft$^2$). This is a useful measure of how well a set of filters are operating and can be used to benchmark one manufacturing site to another. Moreover, the processes described herein show superior wax cake liquids to solids (liquids:solids) volume ratios. Lower amounts of liquids trapped in the wax cake can lead to a decrease in the amount of solvent necessary to produce a fully refined wax and increase throughput of the feed. High amounts of liquid occluded in the wax cake can require higher volumes of wash solvent and a longer wash time on the filter, leading to higher solvent volumes necessary and slower filters. Lower liquids:solids volume ratios of the wax cake mean that the oil occluded in the wax cake is less and is easier to fully refine. The processes described herein can show lower liquids:solids volume ratios than conventional processes.

Further, dewaxing plants having e.g., cooling towers and separation units, can be repurposed for the deoiling processes described herein. Such plants can include those that have equipment for dilution chilling and/or utilize Dil-Chill$^{SM}$ processes.

For the purposes of this present disclosure and the claims thereto, and unless otherwise specified, "cooling tower" and "dilution chilling zone" are used interchangeably.

For the purposes of this present disclosure, and unless otherwise specified, all numerical values within the detailed description and the claims herein are modified by "about" or "approximately" the indicated value, and consider experimental error and variations that would be expected by a person having ordinary skill in the art.

In at least one embodiment, the deoiling process can involve mixing the feed (which may be hydrotreated) with a chilled deoiling solvent to form an oil-solvent solution. Upon further chilling, precipitated wax (in the form of a wax cake) is separated by, for example, filtration. The temperature and solvent can be selected so that the oil is dissolved by the chilled solvent while the wax is precipitated.

In at least one embodiment, the deoiling process can involve the use of a cooling tower where solvent is pre-chilled and added incrementally at several points along the height of the cooling tower. The feed-solvent mixture can be agitated while chilling to permit substantially instantaneous mixing of the pre-chilled solvent with the oil. The pre-chilled solvent can be added incrementally along the length of the cooling tower so as to maintain an average chilling rate at about 8° F./min or less, such as from about 1° F./min to about 5° F./min, such as from about 2° F./min to about 4° F./min. The final temperature of the precipitated wax/oil-solvent mixture (a wax slurry) in the cooling tower can be from about 40° F. (about 4.5° C.) to about 75° F. (about 24° C.), such as from about 45° F. (about 7° C.) to about 70° F. (about 21° C.). The mixture can then be sent to a separation zone, such as a filtration system, to separate precipitated wax from the mixture. In some embodiments, the amount of solvent added to the feed can be sufficient to provide a liquids:solids volume ratio of the wax slurry exiting the cooling tower of from about 10:1 to 20:1. In the separation zone where the wax cake forms on the filter, the amount of solvent added to the feed can be sufficient to provide a liquids:solids volume ratio of the wax cake of from about 1:1 to about 9:1, such as from about 2:1 to about 8:1. The liquids:solids volume ratio of the wax cake can depend on the type of wax being produced and how well the crystals are formed. The processes described herein enable an improved (much lower) liquids:solids ratio of the wax cake over conventional processes.

As the mixture is cooled, wax crystals can precipitate out to form a slurry of wax crystals in the cold mixture of oil and solvent. The wax precipitate/oil-solvent mixture passing from the final stage of the cooling tower can be conducted to a separation zone. The wax can be removed from the mixture by separation, such as by filtration (e.g., by using rotary vacuum filters, membrane filters, filter cloths, or a combination thereof), and/or centrifugation.

In some embodiments, the filtrate (containing the solvent and oil) and the wax precipitate can be sent to separate fractionators to separate and recover the deoiling solvent from the deoiled wax precipitate and from the oil. In at least one embodiment, additional refining, if any, can then be performed on the wax precipitate, the oil, and the deoiling solvent. In some embodiments, the deoiling solvent recovered from the fractionators can be passed to heat exchangers (referred to as chillers), to lower the solvent temperature sufficient for deoiling.

In at least one embodiment, cooling towers and other equipment in a conventional dewaxing plant can be repurposed to provide a deoiling process. Here, while the solvent temperature in the dilution chilling zone for a dewaxing process can be from about −30° F. to about −20° F., the dilution chilling zone for a deoiling process in some embodiments can be from about 10° F. to about 30° F. For deoiling, and in some embodiments, the temperature of the slurry exiting the final stage of the cooling tower and/or entering the separation zone can be higher such as from about 40° F. (about 4.5° C.) to about 80° F. (about 27° C.), such as from about 40° F. (about 4.5° C.) to about 75° F. (about 24° C.), such as from about 45° F. (about 7° C.) to about 70° F. (about 21° C.). Further, the solvent composition ratio (v/v) used in at least one stage of the deoiling process can be much higher (e.g., about 6:1 to about 7:1) versus a typical dewaxing process (about 2.5:1 to about 3.5:1). At least one advantage here is the higher ratio of anti-solvent (e.g., methyl ethyl ketone) that will lead to higher filtration rates. Higher amounts of anti-solvent (e.g., methyl ethyl ketone) can be beneficial due to it having a lower viscosity than either methyl isobutyl ketone or toluene and it raises the filtration temperature needed further reducing the viscosity.

Feed for a deoiling process can include a wax content of about 70 wt % or more, while the feed for a conventional dewaxing process can have a wax content of about 30 wt % or less. Moreover, conventional dewaxing processes crystallize only about 5% to about 10% of the wax in the cooling tower, with the remaining wax being formed in scraped surface chillers (about 20-25% total). The deoiling processes described herein provide a much improved amount of feed crystallized in the cooling tower and the amount of feed crystallized in the cooling tower can be, in some embodiments, greater than about 40%, such as about 40% to about 70%, or higher. For example, if the feed is 1,000 bbl/day, and one achieves 25% crystallization, then the slurry is 750 bbl/day oil, 250 bbl/day wax (Solids). The more crystals that are formed in the tower without scraped surface chiller being involved can, at least, help the deoiling process and increase crystal quality. In addition, there is no need for a scraped surface chiller for the processes described herein.

Feeds

In at least one embodiment, the feed used in the processes described herein can be a wax-containing feed (e.g., a waxy petroleum oil stock or a distillate fraction thereof), such as a wax-containing feed that boils in the lubricating oil range, which is typically from about 650° F. (about 343° C.) to about 1050° F. (about 565° C.), and can be derived from mineral or synthetic sources.

Other feeds useful for the processes described herein can have a boiling range within the broad range of from about 500° F. (about 260° C.) to about 1300° F. (about 705° C.), such as fractions boiling within the range of from about 550° F. (about 285° C.) to about 1200° F. (about 650° C.).

Exemplary feeds include those derived from a viscosity base stock, such as 100N oil, 150N oil, 300N oil, 600N oil, a brightstock oil, and a combination thereof. In at least one embodiment, the wax content of the feed can be about 5 wt % or more, and can range up to about 100 wt % wax, such as about 10 wt % or more, such as about 20 wt % or more, such as about 30 wt % or more, such as about 40 wt % or more, such as about 50 wt % or more, such as about 60 wt % or more, such as about 70 wt % or more, such as about 75 wt % or more, such as about 80 wt % or more, such as about 85 wt % or more, such as about 90 wt % or more, such as about 95 wt % or more. In at least one embodiment, the wax content of the feed can be from about 70 wt % to about 100 wt %, such as from about 75 wt % to about 95 wt %, such as from about 80 wt % to about 90 wt %. The wax content of a feed is determined by ASTM D721. The waxy feeds may be derived from a number of sources such as oils derived from solvent refining processes such as raffinates, partially solvent dewaxed oils, deasphalted oils, distillates, vacuum gas oils, coker gas oils, slack waxes, foots oils and the like, and Fischer-Tropsch waxes.

Exemplary feeds can include slack waxes. Slack waxes are typically derived from hydrocarbon feeds by solvent or propane dewaxing. In some embodiments, the feed to the process can include a slack wax, such as a petroleum slack wax or a recycled slack wax. In these feeds of mineral oil origin, the waxes can be mostly paraffins of high pour point, comprising straight chain and slightly branched chain paraffins such as methylparaffins.

In some embodiments, the feed can be a paraffinic wax.

In at least one embodiment, about 70 wt % or more of the paraffin content in the feed can be n-paraffins, such as about 75 wt % or more, such as about 80 wt % or more, such as about 85 wt % or more of the paraffin content in the feed can be n-paraffins, such as about 90 wt % or more, such as about 91 wt % or more, such as about 92 wt % or more, such as about 93 wt % or more, such as about 94 wt % or more, such as about 95 wt % or more, such as about 96 wt % or more, such as about 97 wt % or more, such as about 98 wt % or more, such as about 99 wt % or more based on the total paraffin content of the feed, as determined by gas chromatography.

In at least one embodiment, about 30 wt % or less of the paraffin content in the feed can be iso-paraffins, such as about 25 wt % or less, such as about 20 wt % or less, such as about 15 wt % or less of the paraffin content in the feed can be iso-paraffins, such as about 10 wt % or less, such as about 9 wt % or less, such as about 8 wt % or less, such as about 7 wt % or less, such as about 6 wt % or less, such as about 5 wt % or less, such as about 4 wt % or less, such as about 3 wt % or less, such as about 2 wt % or less, such as about 1 wt % or less based on the total paraffin content of the feed, as determined by gas chromatography.

In at least one embodiment, the feed is a brightstock wax. The components of the brightstock wax can have a total average carbon number of from about 40 to about 60. carbon number. A non-limiting example of a brightstock wax can have one or more of the following components with the components adding up to 100 wt %, or, if not adding up to 100 wt %, the balance then being made up by at least one other wax component:

(a) a n-paraffin content of about 20 wt % or lower, such as from about 5 wt % to about 15 wt %, such as from about 6 wt %, about 7 wt %, about 8 wt %, about 9 wt %, or about 10 wt % up to about 11 wt %, about 12 wt %, about 13 wt %, or about 14 wt %, as determined by gas chromatography; and/or (b) a non n-paraffin content (the non n-paraffin content comprising naphthenes, iso-paraffins, and/or aromatics) of about 80 wt % or more, such as from about 85 wt % to about 95 wt %, such as from about 86 wt %, about 87 wt %, about 88 wt %, about 89 wt %, or about 90 wt % up to about 91 wt %, about 92 wt %, about 93 wt %, or about 94 wt %, as determined by gas chromatography.

In at least one embodiment, the feed is a high melt wax. The components of the high melt wax can have a total average carbon number of from about 30 to about 45. A non-limiting example of a high melt wax can have one or more of the following components with the components adding up to 100 wt %, or, if not adding up to 100 wt %, the balance then being made up by at least one other wax component:

(a) a n-paraffin content of about 35 wt % or lower, such as from about 15 wt % to about 35 wt %, such as from about 16 wt %, about 17 wt %, about 18 wt %, about 19 wt %, about 20 wt %, about 21 wt %, about 22 wt %, about 23 wt %, about 24 wt %, or about 25 wt % up to about 26 wt %, about 27 wt %, about 28 wt %, about 29 wt %, about 30 wt %, about 31 wt %, about 32 wt %, about 33 wt %, about 34 wt %, as determined by gas chromatography; and/or (b) a non n-paraffin content (the non n-paraffin content comprising naphthenes, iso-paraffins, and/or aromatics) of about 65 wt % or more, such as from about 65 wt % to about 85 wt %, such as from about 66 wt %, about 67 wt %, about 68 wt %, about 69 wt %, about 70 wt %, about 71 wt %, about 72 wt %, about 73 wt %, about 74 wt %, or about 75 wt % up to about 76 wt %, about 77 wt %, about 78 wt %, about 79 wt %, about 80 wt %, about 81 wt %, about 82 wt %, about 83 wt %, about 84 wt %, as determined by gas chromatography.

In at least one embodiment, the feed is a mid melt wax. The components of the mid melt wax can have a total average carbon number of from about 25 to about 35. A non-limiting example of a mid melt wax can have one or more of the following components with the components adding up to 100 wt %, or, if not adding up to 100 wt %, the balance then being made up by at least one other wax component:

(a) a n-paraffin content of about 45 wt % or lower, such as from about 30 wt % to about 45 wt %, such as from about 31 wt %, about 31 wt %, about 33 wt %, about 34 wt %, about 35 wt %, about 36 wt %, or about 37 wt % up to about 38 wt %, about 39 wt %, about 40 wt %, about 41 wt %, about 42 wt %, about 43 wt %, or about 44 wt %, as determined by gas chromatography; and/or (b) a non n-paraffin content (the non n-paraffin content comprising naphthenes, iso-paraffins, and/or aromatics) of about 55 wt % or more, such as from about 55 wt % to about 70 wt %, such as from about 56 wt %, about 57 wt %, about 58 wt %, about 59 wt %, about 60 wt %, about 61 wt %, or about 62 wt % up to about 63 wt %, about 64 wt %, about 65 wt %, about 66 wt %, about 67 wt %, about 68 wt %, or about 69 wt %, as determined by gas chromatography.

In at least one embodiment, the feed is a low melt wax. The components of the low melt wax can have a total average carbon number of from about 20 to about 30. A non-limiting example of a low melt wax can have one or more of the following components with the components adding up to 100 wt %, or, if not adding up to 100 wt %, the balance then being made up by at least one other wax component:

(a) a n-paraffin content of about 80 wt % or lower, such as from about 65 wt % to about 80 wt %, such as from about 66 wt %, about 67 wt %, about 68 wt %, about 69 wt %, about 70 wt %, about 71 wt %, about 72 wt %, or about 73 wt % up to about 74 wt %, about 75 wt %, about 76 wt %, about 77 wt %, about 78 wt %, or about 79 wt %, as determined by gas chromatography; and/or (b) a non n-paraffin content (the non n-paraffin content comprising naphthenes, iso-paraffins, and/or aromatics) of about 20 wt % or more, such as from about 20 wt % to about 30 wt %, such as from about 21 wt %, about 22 wt %, about 23 wt %, about 24 wt %, or about 25 wt % up to about 26 wt %, about 27 wt %, about 28 wt %, or about 29 wt %, as determined by gas chromatography.

The n-paraffin content and non n-paraffin content of the feed is determined by gas chromatography as described below.

Petroleum waxes, that is, waxes of paraffinic character can be derived from the refining of petroleum and other liquids by physical separation from a wax-containing refinery stream, usually by chilling the stream to a temperature at which the wax separates, usually by solvent dewaxing, e.g., MEK/toluene dewaxing or by means of an autorefrigerant process such as propane dewaxing. These waxes can have high initial boiling points above about 650° F. (about 345° C.) which render them extremely useful for processing into lubricants which also require an initial boiling point of at least 650° F. (about 345° C.). The presence of lower boiling components can be present since they can be removed together with products of similar boiling range produced during the separation steps which follow the characteristic processing steps. Since these components can load up the process units, they can be excluded by suitable choice of feed cut point. The end point of wax feeds derived from the solvent dewaxing of neutral oils, e.g., distillate fractions produced by the vacuum distillation of long or atmospheric resids, can usually be not more than about 1100° F. (about 595° C.) so that they can normally be classified as distillate rather than residual streams; but high boiling wax feeds such as petroleum waxes, e.g., the waxes separated from brightstock dewaxing which may typically have an end point of up to about 1300° F. (about 705° C.), may also be employed.

Feeds of this type can include slack waxes, such as the waxy product obtained directly from a solvent dewaxing process, e.g. an MEK or propane dewaxing process. The slack wax, which is a solid to semi-solid product, containing mostly highly waxy paraffins (mostly n- and mono-methyl paraffins) together with occluded oil, may be fed directly to the first step of the present processing sequence as described below without the requirement for any initial preparation.

A slack wax is named for the type of base oil from which it is extracted. These base stocks are distinguished by their viscosities, in Saybolt Universal Seconds (SUS), at 100° F. Typical ranges are: light neutral: 60-200 SUS; medium neutral: 200-450 SUS; heavy neutral: 450-1000 SUS.

In at least one embodiment, the feed may be a Fischer-Tropsch-derived wax. Fischer-Tropsch waxes are waxes typically produced by the Fischer-Tropsch process. In some embodiments, the feed can be a Fischer-Tropsch cobalt-derived wax, which is a wax produced by a Fischer-Tropsch process employing a cobalt-based Fischer-Tropsch catalyst. In at least one embodiment, the feed can be a low-temperature Fischer-Tropsch (LTFT) cobalt-derived wax. In at least one embodiment, the feed can be produced by a gas-to-liquids low-temperature Fischer-Tropsch process employing a cobalt-based catalyst.

In at least one embodiment, the feed for the processes of the present disclosure includes one or more of the feeds described above, such as two or more feeds.

Deoiling

In at least one embodiment of the present disclosure, a feed (e.g., a waxy petroleum stock) can be deoiled by cooling the feed in a stirred vessel, such as a vertical tower, with a pre-chilled solvent that can solubilize at least a portion of the feed. The solvent can be introduced incrementally along the length of the vessel. In at least one embodiment, the degree of agitation in the stirred vessel can be sufficient to permit substantially instantaneous mixing of the feed and solvent. The pre-chilled solvent can be added in an amount sufficient to permit easy handling and good filtration rates. The wax, which precipitates during the cooling stage, may be separated from the solution by a filter. The oil may also be recovered from the solution following separation of the wax by methods known in the art. The solvent may also be recovered from the solution by methods known in the art.

Referring to FIG. 1, the feed to be deoiled can be conducted away from storage tank 1, through line 2, to the top of the vertical cooling tower 3, where it can enter the first stage of the cooler 4(a). The selected solvent for the feed can be passed from storage tank 5 through line 6, through heat exchangers 7 and 8, where the solvent temperature can be reduced to a level sufficient to cool the feed to the desired deoiling temperature. Coolant can enter the heat exchangers 7 and 8 through lines 24 and 25, respectively, and leave through lines 26 and 27. The solvent can leave the heat exchanger 8, through line 9, and enter manifold 10. The manifold can include a series of parallel lines providing solvent inlets 11 to the several stages of the cooling tower 3. The rate of flow through each inlet can be regulated by flow control means (not shown). The rate of solvent flow can be regulated so as to maintain a desired temperature gradient along the height of the cooling tower 3.

The first portion or increment of the solvent can enter the first stage, 4(*a*), of the cooling tower 3 where it can be substantially instantaneously admixed with the feed due to the action of the agitator 12(*a*). The agitator can be driven by a variable speed motor 13 and the degree of agitation can be controlled by variation of the motor speed, with due allowance for the flow rate through the cooling tower. The wax-solvent mixture may pass upwardly or downwardly through the cooling tower 3 (downward flow only has been shown). Additional pre-chilled solvent can be introduced into at least a portion of the several stages 4, through inlets 11 so as to maintain a predetermined cooling rate (e.g., a substantially constant cooling rate) and at the same time to provide the desired degree of dilution. In at least one embodiment, any number of stages (for example from about 1 stage to about 60 stages) may be employed. In some embodiments, there can be about 6 or more stages in the cooling tower 3, such as about 8 or more stages, such as about 12 or more stages, such as about 16 or more stages. In some embodiments, the process can include a multiplicity of cooling towers.

The wax-solvent solution (a slurry) with precipitated wax can pass from the final stage of the cooling tower 3 through line 14 to a separation zone 15 (e.g., a filter zone) where the wax can be separated from the solution. Any suitable means, such as filtration and/or centrifugation, for such separation may be employed. The wax-solvent (such as a wax cake) can be removed from the separation equipment through line 16. The solvent can be recovered in a suitable fractionator system 19, which can be a distillation tower, through line 17 and the wax can exit through line 18. The separation zone 15 can include one or more filter stages, where the wax can be separated from the oil and solution to form a wax cake and the wax cake can be washed with a solvent. At the separation zone 15, the solvent used to wash the wax cake can be applied in a different manner than it is applied in the cooling tower 3. In at least one embodiment, the solvent can be sprayed onto the wax cake.

The selected solvent for washing the wax can be passed from storage tank 28 through line 29 to separation zone 15 through heat exchangers (not shown), where the solvent temperature can be adjusted to a level sufficient to cool the feed to the desired deoiling temperature. Coolant (not shown) can enter and exit the heat exchangers. The solvent can leave the heat exchangers and enter the separation zone 15 at various stages of the separation zone 15 through inlets 30. The rate of flow through each inlet can be regulated by flow control means (not shown).

The oil-solvent solution can leave the separation zone 15 through line 20 and can pass to a fractionator system 21 to separate the oil from the solution. Any suitable methods known in the art for this fractionation can be used, such as distillation or selective adsorption. The oil can be removed from the fractionator system 21 and can be recovered through line 22. The solvent can be removed through line 23.

The inventor has found that there is no need for a scraped surface chilling as in conventional dilution chilling processes. This can result in a large cost and time savings. In at least one embodiment, the process can be free of scraped surface chilling. In these and other embodiments, the slurry exiting the dilution chilling zone can bypass a scraped surface chiller (not shown) and be conducted directly to a separation zone. However, one skilled in the art could use scraped surface chilling as part of the process. Thus, in at least one embodiment, the process includes scraped surface chilling. If scraped surface chilling is used, the scraped surface chilling can come after line 14 and before separation zone 15. Methods of using scraped surface chilling are known in the art.

The inventor has also found that there is no need for warm-up deoiling. This can also result in a large cost and time savings. In at least one embodiment, the process can be free of a warm-up deoiler. In these and other embodiments, the wax cake exiting the separation zone can bypass a warm-up deoiler (not shown) and be conducted directly to a fractionator system. However, one skilled in the art could use a warm-up deoiler as part of the process. Thus, in at least one embodiment, the process includes warm-up deoiling. If warm-up deoiling is used, the warm-up deoiling can come after line 16 and before fractionator system 19. Methods of using warm-up deoiling are known in the art. Typically, warm-up deoiling can be an add-on to a dewaxing process that has already formed the crystals at a lower temperature and can eliminate the need for more crystallization. In warm-up deoiling, and after the oil is dewaxed/deoiled, the slurry can be warmed up and then deoiled.

In at least one embodiment, one or more of pre-dilution ratio, tower inlet temperature, agitator speed, tower dilution ratio, tower temperature profile, solvent composition, solvent flow profile, and/or solvent temperature(s). The value of these and other variables can depend on the type of feed. The use of these and other variables can affect the type of wax crystals formed.

The solvent used at various stages and zones (e.g., in the cooling tower 3 and the separation zone 15) of the process can include those solvents that are miscible with the components other than the solidified wax, that is, the oil or liquid fraction of the mixture, but which have low solvent action on the solidified wax or wax fraction. The solvents can include low viscosity solvents. Non-limiting examples of solvents can include a low molecular weight hydrocarbon, a halogenated hydrocarbon, an aromatic compound (such as a C6 to C10 aromatic compound), an aliphatic ketone (such as a C3 to C6 aliphatic ketone), or a combination thereof. Examples of low molecular weight hydrocarbons can include ethane, propane, butane, propylene, and a combination thereof. Examples of aromatic compounds can include benzene, xylene, toluene, and a combination thereof. Examples of halogenated hydrocarbons can include C2 to C4 chlorinated hydrocarbons, such as dichloromethane, dichloroethane, propylene dichloride, as well as chlorinated aromatic hydrocarbons such as chlorobenzene, and a combination thereof. Examples of aliphatic ketones can include acetone, methyl ethyl ketone (MEK), methyl isobutyl ketone (MIBK), and a combination thereof. Other non-limiting examples of solvents can include sulfur dioxide, furfural, phenol, benzaldehyde, formates, acetates, and the like. In at least one embodiment, the solvent can include a mixture of two or more of the aforementioned solvents. Specific non-limiting examples of suitable solvent mixtures are MEK and MIBK, MEK and toluene, dichloromethane and dichloroethane, and propylene and acetone.

In at least one embodiment, the solvent composition used at various stages of the cooling tower 3 can depend on the type of feed. In some embodiments, and when more than one solvent is used, the solvent composition (v/v) can be from about 1:1 to about 10:1, such as from 1:1 to about 9:1, such as from about 2:1 to about 8:1, such as from about 3:1 to about 6:1, such as from about 4:1 to about 5:1. For example and in some embodiments for deoiling a 600N wax feed, the solvent composition can be from about 7:1 to about 10:1, such as about 9:1 MEK:MIBK. As another example and in some embodiments for deoiling a brightstock feed, the solvent composition can be from about 3:1 to about 7:1, such as from about 4:1 to about 6:1, such as about 5:1 MEK: MIBK. The majority of the solvent volume comprises a solvent that is less miscible with the wax. Examples of solvents less miscible with wax include MEK, acetone, and dichloromethane. Examples of solvents that are more miscible with wax typically include benzene, methyl isobutyl ketone, and toluene.

During the operation of the process of the present disclosure, and in at least one embodiment, the feed can be fed to the cooling tower 3 at a temperature above its cloud point. In at least one embodiment, the feed can be fed to the cooling tower 3 at a temperature above its melting point. In some embodiments, and in the case of a feed containing about 50 wt % or more wax, such as about 70 wt % or more, the feed can enter the cooling tower at a temperature of about 120° F. or more, such as from about 130° F. to about 190° F., such as from about 135° F. to about 175° F., such as from about 140° F. to about 170° F., such as from about 145° F. to about 165° F., such as from about 150° F. to about 160° F.

In some embodiments, the feed entering the cooling tower can be at least partially pre-diluted when, e.g., the feed is a heavy feed such as a resid or a brightstock. In at least one embodiment, the feed can be pre-diluted with a solvent (e.g., the same or different solvent entering various stages of the cooling tower) to a solvent to feed ratio (v/v) of from about 0.25:1 to about 1:1, such as from about 0.4 to about 0.9, such as from about 0.5 to about 0.8, such as from about 0.6 to about 0.7.

In at least one embodiment, the feed can be fed to the cooling tower at a feed rate (barrel of oil per hour (bbl/hr)) of from about 20 bbl/hour to about 1000 bbl/hour, such as from about 50 bbl/hour to about 600 bbl/hour, such as from about 100 bbl/hour to about 375 bbl/hour, however, higher or lower feed rates can be used.

Adjusting solvent flow (such as by increasing solvent flow) or adjusting temperature (such as by reducing the temperature) can help control, e.g., the type and amount of crystals formed. In at least one embodiment, the solvent, or solvent mixture, can be pre-chilled to a temperature sufficient to permit cooling of the feed to the desired temperature. The exact temperature employed can depend upon the amount of feed to be cooled and the amount of solvent to be added to the feed. The pre-chilled solvent can be added incrementally along the length of the cooling tower so as to maintain an average chilling rate at about 8° F./min or less, such as from about 1° F./min to about 5° F./min, such as from about 2° F./min to about 4° F./min.

In some embodiments, the temperature profile down the cooling tower can be changed. For example, and in at least one embodiment, there can be a temperature ramp as you proceed down the tower that can allow for the maximum nucleation of wax crystals at the top of the tower and sufficient cooling to grow the crystals before they exit the tower at the bottom. The cold solvent addition can be adjusted at each stage in a manner so as to modify the temperature profile along the tower to ensure that the temperature drop per stage in the initial stages in which wax precipitation occurs is greater than the temperature drop per stage in the final or later stages. Alternatively, and in at least one embodiment, the cold solvent addition can be adjusted at each stage in a manner so as to modify the temperature profile along the tower to ensure that the temperature drop per stage in the initial stages in which wax precipitation occurs is lower than the temperature drop per stage in the final or later stages. The cold solvent can allow the crystals sufficient time and space to nucleate and grow.

In at least one embodiment, the amount of solvent added to at least one stage of the cooling tower can be sufficient to provide a liquids:solids volume ratio of from about 5:1 to about 25:1, such as from about 10:1 to about 20:1, such as from about 12:1 to about 18:1, such as from about 14:1 to about 16:1.

In at least one embodiment, the temperature of the solvent used in the cooling tower can be from about 5° F. (about −15° C.) to about 59° F. (about 15° C.), such as from about 14° F. (about −10° C.) to about 50° F. (about 10° C.), such as from about 23° F. (about −5° C.) to about 41° F. (about 5° C.).

In at least one embodiment, the velocity of the solvent at the injection points within one or more stages of the cooling tower (i.e., at the injection nozzles in the cooling tower) can be from about 20 ft/s to about 100 ft/s, such as from about 40 ft/s to about 60 ft/s.

In at least one embodiment, the impeller speed can be adjusted. Increased impeller speed can provide increased mixing of the cold solvent to allow for increased nucleation and growth of wax crystals. Too high of a mixing impeller speed can cause shearing of wax crystals, breaking of the wax crystals into smaller crystals, reduction of the filterability of the wax and the tower production. In at least one embodiment, the impeller speed can be from about 30 RPM to about 300 RPM, such as from about 40 RPM to about 250 RPM, such as from about 50 RPM to about 200 RPM, such as about 80 RPM to about 180 RPM, such as from about 90 RPM to about 170 RPM.

In at least one embodiment, the degree of agitation used in at least a portion of the stages of the cooling tower can be sufficient to provide substantially instantaneous mixing, e.g., substantially complete mixing of the feed-solvent mixture in about one second or less. In this way, the deleterious effects of shock chilling can be offset, the chilling rate can be more readily controlled, and increased filtration rates can be obtained. In some embodiments, the degree of agitation can be achieved by increasing the agitator RPM when all other mixing variables, e.g., flow rate through the mixer, vessel and agitator design, viscosity of the ingredients, etc. are maintained constant. In at least one embodiment, the agitator speed in at least one stage of the dilution chilling zone (i.e., the cooling tower) can be from about 30 RPM to about 300 RPM, such as from about 40 RPM to about 250 RPM, such as from about 50 RPM to about 200 RPM, such as about 80 RPM to about 180 RPM, such as from about 90 RPM to about 170 RPM.

In at least one embodiment, the dimensionless ratio of cooling tower diameter to agitator diameter can be from about 1.5:1 to about 10:1; the ratio of the impeller blade length to impeller blade width can be from about 0.75:1 to 2:1, such as from about 1:1 to 1.5:1; and/or the ratio of the mixing stage height to the diameter of the stage can be from about 0.2:1 to about 1:1. In some embodiments, a turbine type agitator can be used. Alternatively, other types of agitators, such as propeller agitators, can be used.

In some embodiments, the cooling tower may or may not be baffled. In at least one embodiment, each stage can independently contain from about 0-8 baffles, such as from about 2-8, baffles such as from about 2-4 baffles, located about the outer periphery of each stage. In at least one embodiment, the width of the baffles can range from about 5% to about 15% of the diameter of the tower. In general, the dimensionless ratio of the cross-section of the restricted flow opening to the cross-section of the tower can be from about ⅟₂₀ and about ⅟₂₀₀.

In at least one embodiment, the cooling tower can be operated at a pressure sufficient to prevent flashing of the solvent. In some embodiments, the pressure can be from about 10 psi to about 500 psi, such as from about 100 psi to about 400 psi, such as from about 150 psi to about 300 psi, such as from about 50 psi to about 250 psi.

In at least one embodiment, the amount of crystallization in the dilution chilling zone, based on the total feed entering the dilution chilling zone, can be greater than about 20 vol %, such as from about 30 vol % to about 85 vol % (or higher) such as from about 40 vol % to about 60 vol %, such as from about 45 vol % to about 55 vol %. For example, if the feed is 1,000 bbl/day, and one achieves 25% crystallization, then the slurry is 750 bbl/day oil, 250 bbl/day wax (Solids). The more crystals that are formed in the tower without scraped surface chiller being involved can, at least, help the deoiling process and increase crystal quality. In addition, there is no need for a scraped surface chiller for the processes described herein.

Additionally, and in at least one embodiment, the cooling tower can be washed with a warm solvent. Such washing can provide a method to melt wax build-up in the trays of the tower that may be causing poor mixing or poor distribution of the cold solvent used to grow the crystals.

The processes described herein provide, at least, the advantage of a lower volume ratio of solvent used per amount of feed. In at least one embodiment, a volume ratio of solvent used per amount of feed (in units of barrels of solvent per barrel of feed) can be about 8.5 or less, such as about 8 or less, such as about 7 or less, such as about 6 or less, such as about 5 or less, such as about 4.5.

The slurry that exits the final stage of the cooling tower can be fed to the separation zone (e.g., filter zone) at a rate of from about 20 bbl/hour to about 1000 bbl/hour, such as from about 50 bbl/hour to about 600 bbl/hour, such as from about 75 bbl/hour to about 500 bbl/hour, such as from about 100 bbl/hour to about 375 bbl/hour, such as from about 150 bbl/hour to about 300 bbl/hour, such as from about 200 bbl/hour to about 250 bbl/hour; however, higher or lower feed rates can be used. The temperature of the slurry that enters the separation zone can depend on the type of wax produced.

In at least one embodiment, the temperature of the slurry exiting the final stage of the cooling tower and/or entering the separation zone can be from about 30° F. (−1° C.) to about 100° F. (38° C.), such as from about 50° F. (10° C.) to about 75° F. (24° C.), such as from about 55° F. (13° C.) to about 70° F. (21° C.), such as from about 60° F. (15° C.) to about 65° F. (18° C.). In at least one embodiment, the temperature of the slurry exiting the final stage of the cooling tower and/or entering the separation zone can be from about 40° F. (4.5° C.) to about 75° F. (24° C.), such as from about 45° F. (7° C.) to about 70° F. (21° C.).

The amount of wash solvent added to at least one filter stage of the separation zone can be sufficient to provide a low oil content wax. The solvent is added in a solvent:slurry ratio of from about 0.25:1 to about 10:1, such as from about 2:1 to about 8:1, such as from about 3:1 to about 7:1, such as from about 4:1 to about 6:1. In at least one embodiment, the temperature of the solvent used in the filter zone can be different from the temperature of the solvent used in the cooling tower. The temperature of the solvent used in the filter zone can be from about 45° F. (7° C.) to about 80° F. (27° C.), such as from about 50° F. (10° C.) to about 75° F. (24° C.), such as from about 55° F. (13° C.) to about 70° F. (21° C.), such as from about 60° F. (15° C.) to about 65° F. (18° C.).

In at least one embodiment, the temperature of the solvent added to at least one filter stage can be about the same temperature as that of the slurry or at a temperature warmer than the slurry. In at least one embodiment, the solvent composition used at various stages of the separation zone can depend on the type of feed. In some embodiments, and when more than one solvent is used, the solvent composition (v/v) the solvent composition (v/v) can be from about 1:1 to about 10:1, such as from 1:1 to about 9:1, such as from about 2:1 to about 8:1, such as from about 3:1 to about 6:1, such as from about 4:1 to about 5:1. The majority of the solvent volume comprises a solvent that is less miscible with the wax. Examples of solvents less miscible with wax include MEK, acetone, and dichloromethane. Examples of solvents that are more miscible with wax typically include benzene, methyl isobutyl ketone, and toluene.

In at least one embodiment, the separation zone can include one or more separation stages (e.g., filter stages). For each of these stages, independently, any suitable filter known in the art can be used. Suitable filters for separating wax from oil can include rotary drum filters and membrane filters. Rotary drum filters are well known and, in at least one embodiment, can be a rotary drum vacuum filter containing a drum and a filtering medium such as a filter cloth, felt, needle felt, natural material, TB-3, or otherwise synthetic. The drum can include equipment for applying pressure and/or vacuum across the filtering medium wherein an oily filtrate can be drawn through the filtering medium and a wax cake is deposited thereon. The wax cake can be washed with solvent and removed from the filter. Centrifuges may also be used in at least part of the separation zone.

In at least one embodiment, the speed of the rotating filter drum can be adjusted to provide a balance between slurry feed rate and product quality. In some embodiments, the speed of the rotating drum filter used in at least a portion of the stages of the separation zone can be from about 0.1 RPM to about 3 RPM, such as from about 0.25 RPM to about 2.5 RPM, such as from about 1 RPM to about 2 RPM, such as from about 0.5 RPM to about 1.5 RPM.

In at least one embodiment, the separation zone can be operated at a pressure sufficient to prevent flashing of the solvent. In some embodiments, the pressure can be from about 0.2 psig to about 10 psig, such as from about 0.5 psig to about 5 psig, such as from about 1 psig to about 4 psig, such as from about 2 psig to about 3 psig.

In at least one embodiment, the filtration rate (first stage or total filter area of the filter zone) is about 0.5 barrel/day/ft$^2$ or more, such as from about 0.5 barrel/day/ft$^2$ to about 11 barrel/day/ft$^2$, such as from about 0.5 barrel/day/ft$^2$ to about 5 barrel/day/ft$^2$, such as from about 1.1 barrel/day/ft$^2$ to about 4 barrel/day/ft$^2$ or from about 0.7 barrel/day/ft$^2$ to about 4 barrel/day/ft$^2$. In at least one embodiment, the filtration rate (first stage or total filter area of the filter zone) is at least about 1.5 barrel/day/ft$^2$ or more, such as about 2 barrel/day/ft$^2$, about 3 barrel/day/ft$^2$, about 4 barrel/day/ft$^2$, about 5 barrel/day/ft$^2$, or about 6 barrel/day/ft$^2$ up to about 11 barrel/day/ft$^2$, about 10 barrel/day/ft$^2$, about 9 barrel/day/ft$^2$, about 8 barrel/day/ft$^2$, or about 7 barrel/day/ft$^2$.

As described above, the dilution chilling zone can be divided into 2 or more stages, such as up to about 60 stages, such as about 6 or more stages, such as about 8 or more stages, such as about 12 or more stages, such as about 16 or more stages, such as about 17 or more stages. In at least one embodiment, each of these stages independently can have the same or different parameters of e.g., temperature of the solvent added, chilling rate, and solvent system (type and amounts of solvent).

As a non-limiting example (a high melt slack wax), and as shown in Table 1, the stages of the dilution chilling zone can have the following parameters:

TABLE 1

| Stage | Temperature of solvent added, ° C. | Chilling rate, ° C./min. (° F./min.) | Solvent system (v/1) |
|---|---|---|---|
| 1 | −6 to 0 | 0.5 (0.9) | 0.12 |
| 2 | −6 to 0 | 0.7 (1.26) | 0.13 |
| 3 | −6 to 0 | 0.75 (1.35) | 0.14 |
| 4 | −6 to 0 | 0.8 (1.44) | 0.16 |
| 5 | −6 to 0 | 1 (1.8) | 0.17 |
| 6 | −6 to 0 | 1.1 (1.98) | 0.2 |
| 7 | −6 to 0 | 1.2 (2.16) | 0.23 |
| 8 | −6 to 0 | 1.4 (2.52) | 0.26 |
| 9 | −6 to 0 | 1.4 (2.52) | 0.3 |
| 10 | −6 to 0 | 1.5 (2.7) | 0.33 |
| 11 | −6 to 0 | 1.6 (2.88) | 0.4 |
| 12 | −6 to 0 | 1.7 (3.06) | 0.5 |
| 13 | −6 to 0 | 1.9 (3.42) | 0.59 |
| 14 | −6 to 0 | 2 (3.6) | 0.7 |
| 15 | −6 to 0 | 2.2 (3.96) | 0.75 |
| 16 | −6 to 0 | 2.3 (4.14) | 0.8 |

Solvent system in Table 1 refers to the volume of solvent injected per volume of feed. Chilling rate refers to how much the slurry cools down during that stage. Although the example in Table 1 lists 16 stages, the parameters can be applied to a dilution chilling zone having more than 16 stages or less than 16 stages.

Table 2 shows a non-limiting example of inlet temperatures for each stage for three different waxes—a low melt wax, a high melt wax, and a brightstock wax.

TABLE 2

| | Inlet Temperatures (° F.) | | |
|---|---|---|---|
| Stage | Low melt wax | High melt wax | Brightstock wax |
| 1 | 125 | 160 | 180 |
| 2 | 119 | 151 | 169 |
| 3 | 113 | 143 | 158 |
| 4 | 107 | 135 | 148 |
| 5 | 102 | 127 | 138 |
| 6 | 97 | 120 | 130 |
| 7 | 92 | 113 | 121 |
| 8 | 87 | 106 | 113 |
| 9 | 82 | 99 | 105 |
| 10 | 78 | 93 | 97 |
| 11 | 74 | 87 | 90 |
| 12 | 69 | 81 | 83 |
| 13 | 65 | 75 | 76 |
| 14 | 61 | 70 | 70 |
| 15 | 58 | 64 | 64 |
| 16 | 54 | 60 | 59 |
| 17 | 52 | 56 | 54 |

Although the example in Table 2 lists 17 stages, the parameters can be applied to a dilution chilling zone having more than 17 stages or less than 17 stages.

In some embodiments, and for each of the parameters listed above, the parameters in one or more dilution chilling stages can be the same or different from other dilution chilling stages. In some embodiments, and for each of the parameters listed above, the parameters in one or more filter stages can be the same or different from other filter stages.

Filtration rate and solvent use can be correlated with crystal size distribution (CSD) of the wax crystals. The cases can be feed dependent and the process variable solution set can be unique to a particular set of circumstances. In some embodiments, the crystal size distribution can have one or more of the following characteristics: (a) narrow size distribution (low standard deviation/mean); b) large mean crystal size providing the highest population of the largest crystals possible; c) spherical; and (d) "hard" (not soft) crystals that will not deform or break during the filtration process. In at least one embodiment, the crystal size distribution can be broad.

Dewaxing

In at least one embodiment, a solvent dewaxing operation can be performed prior to deoiling. Solvent dewaxing can involve mixing a feedstock (which may be hydrotreated) with chilled dewaxing solvent to form an oil-solvent solution. The temperature and solvent can be selected so that the oil is dissolved by the chilled solvent while the wax is precipitated. A suitable solvent dewaxing process can involve the use of a cooling tower (such as a dilution chilling zone described above) where solvent is prechilled and added incrementally at several points along the height of the cooling tower. The oil-solvent mixture can be agitated during chilling to permit substantially instantaneous mixing of the prechilled solvent with the oil. The prechilled solvent can be added incrementally along the length of the cooling tower so as to maintain an average chilling rate at or below about 10° F./min (about 5.6° C./min), usually from about 1° F./min to about 5° F./min (about 0.6° C./min to about 2.8° C./min). Solvent temperatures during dewaxing can be from about −40° F. to about −10° F. (−40° C. to about −23° C.), such as from about −35° F. to about −15° F. (−37° C. to about −26° C.), such as from about −30° F. to about −20° F. (−34° C. to about −29° C.). Further details on incremental solvent dilution chilling may be found in U.S. Pat. No. 5,401,383 which is incorporated herein by reference in its entirety.

In general, the amount of solvent added can be sufficient to provide a liquid/solid weight ratio of from about 5/1 to about 100/1, such as from about 5/1 to about 20/1, such as from about 7/1 to about 15/1, such as from about 9/1 to about 12/1 at the dewaxing temperature and a solvent/oil volume ratio of from about 1/1 to about 7/1, such as from about 1.5/1 to about 5/1, such as from about 2/1 to about 4/1. Representative dewaxing solvents include those solvents described above useful for deoiling such as aliphatic ketones (e.g., methyl ethyl ketone and methyl isobutyl ketone), $C_3$-$C_6$ hydrocarbons such as propane and butane, aromatic solvents such as benzene, toluene or xylene, and mixtures thereof.

Solvent dewaxing may occur in the same unit as the deoiling process or a separate unit. The same or similar apparatus as shown in FIG. 1, and as described above, can be used for the dewaxing process.

Prior to undergoing the deoiling process, the wax may be separated from the mixture of oil and solvent by filtration, e.g., by using rotary vacuum filters or membrane filters. Centrifugation and filter cloths are other methods for separating wax. This separation may be performed via the same or similar methods described above. The separation may be performed in the same separation unit used to separate the deoiled slurry or a different separation unit.

The effluent from solvent dewaxing can be conducted directly into a solvent deoiling process, a separation stage, or a combination thereof, without going through a scraped surface chiller. Thus, the processes described herein enable bypassing a scraped surface chillers.

In at least one embodiment, dewaxing a feed to form a waxy feed includes introducing a feed and a solvent to a dilution chilling zone having one or more dilution chilling stages. The feed and the solvent can be mixed, by agitation, in the one or more dilution stages. The feed-solvent mixture can be cooled in the dilution chilling zone at an average rate of about 10° F./min or less, such as about 8° F./min or less, such as from about 1° F./min to about 5° F./min, such as from about 2° F./min to about 4° F./min. In at least one embodiment, the waxy feed can be optionally introduced to a filter zone having one or more filter stages. The waxy feed can then be introduced into a deoiling process.

Hydrofinishing

In at least one embodiment, the composition obtained from the deoiling process described herein can be hydrofinished in a suitable hydrofinishing reactor.

Hydrofinishing conditions can include temperatures from about 125° C. to about 425° C., such as from about 150° C. to about 350° C., such as from about 180° C. to about 280° C., total pressures from about 400 psig (about 2.9 MPag) to about 3000 psig (about 20.7 MPag), such as from about 1500 psig (about 10.3 MPag) to about 2500 psig (about 17.2 MPag), and liquid hourly space velocity (LHSV) from about $0.1\ h^{-1}$ to about $5\ h^{-1}$, such as from about 0.5 to about $3\ hr^{-1}$, such as from about $1\ h^{-1}$ to about $1.5\ h^{-1}$.

Hydrofinishing catalysts can include those containing Group 6 metals (based on the IUPAC Periodic Table format having Groups from 1 to 18), Groups 8-10 metals, and mixtures thereof. Non-limiting example metals can include at least one noble metal having a strong hydrogenation function, such as platinum, palladium and mixtures thereof. Non-limiting example metals can be metals having at least one metal sulfide having a strong hydrogenation function. The mixture of metals may also be present as bulk metal catalysts wherein the amount of metal can be about 30 wt % or greater based on catalyst. Suitable metal oxide supports include low acidic oxides such as silica, alumina, silica-aluminas, and/or titania. Example hydrofinishing catalysts can include at least one metal having relatively strong hydrogenation function on a porous support. Typical support materials include amorphous or crystalline oxide materials such as alumina, silica, and silica-alumina. The support materials may also be modified, such as by halogenation, such as fluorination. The metal content of the catalyst can be as high as about 20 wt % for non-noble metals. Noble metals can usually be present in amounts no greater than about 1 wt %. In at least one embodiment, a hydrofinishing catalyst can include a crystalline material belonging to the M41S class or family of catalysts. The M41S family of catalysts are mesoporous materials having high silica content. Non-limiting examples include MCM-41, MCM-48 and MCM-50. In some embodiments, a suitable hydrofinishing catalyst contains MCM-41 whose preparation and use for hydrogenation is described in U.S. Pat. Nos. 5,098,684, 5,227,353, 5,573,657 and 5,264,641, each of which is incorporated herein by reference in their entirety.

Figure 2:
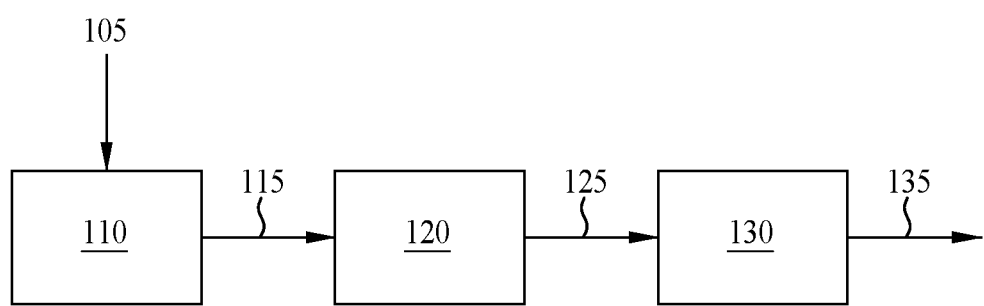
FIG. 2 schematically shows an example of a configuration suitable for processing a feed according to at least one embodiment.

FIG. 2 schematically shows an example of a configuration suitable for processing a feed according to at least one embodiment. A feed 105 may be introduced into a dewaxing unit 110 where it can undergo dewaxing and an optional separation. The waxy feed 115 (effluent flowing from the dewaxing unit 110) can then be passed to a deoiling unit 120. An example configuration of a deoiling unit is that shown in FIG. 1. The deoiled feed 125 (effluent flowing from deoiling unit 120) can optionally be passed to a hydrofinishing unit 130 to form a hydrofinished composition 135. In at least one embodiment, the configuration for processing a feed is free of a scraped surface chiller, a warm-up deoiler, or a combination thereof. Any feed or effluent (e.g., 105, 115, 125 and/or 135) can bypass a scraped surface chiller, a warm-up deoiler, or a combination thereof according to some embodiments. According to various embodiments of the present invention, dewaxing and deoiling is performed in the place, for example, the same dilution chilling zone or in the same unit. According to various embodiments, parameters such as the temperature, the type of solvent and/or the amount of solvent are selected and adjusted as appropriate so that dewaxing of the feed or deoiling of the waxy feed can occur. As an example, a method of deoiling a feed can include dewaxing a feed, the dewaxing including introducing a feed and a dewaxing solvent to a dilution chilling zone; and forming a waxy feed. A deoiled solvent may then be introduced to the waxy feed in the dilution chilling zone (the waxy feed comprising a wax and an oil) under conditions selected to achieve deoiling (for example, desirable temperatures and solvent amount for achieving deoiling in the most economically advantageous way as would be readily determined by a person of ordinary skill informed by the present specification. The waxy feed and the deoiling solvent can be mixed in the dilution chilling zone to form a slurry. The slurry may then be introduced to a filter zone. The wax can then be separated from the oil and the deoiling solvent to form a wax cake in a first filter stage, and the wax cake may be washed with the deoiling solvent to obtain a composition comprising a wax.

Wax Products

A wax product can be a composition obtained from one or more processes described herein. In at least one embodiment, the wax product can be part of a composition.

In at least one embodiment, the wax product can have an average melting point or congealing point of from about 40° C. to about 90° C., such as from about 50° C. to about 80° C., such as from about 60° C. to about 70° C. or from about 55° C. to about 65° C., when determined using the testing procedure specified in ASTM D87 (for lower melt waxes), ASTM D938 (for higher melt waxes).

In at least one embodiment, the wax product can have a needle penetration at 25° C. of from about 10 dmm to about 150 dmm, such as from about 20 dmm to about 100 dmm, such as from about 30 dmm to about 90 dmm, such as from about 40 dmm to about 80 dmm, such as from about 50 dmm to about 70 dmm, such as from about 60 dmm to about 65 dmm, when determined using the testing procedure specified in ASTM D1321.

In at least one embodiment, the wax product can have a Saybolt color of from about 10 to about 30, such as from about 15 to about 28, such as from about 20 to about 26, such as from about 22 to about 24, when determined using the testing procedure specified in ASTM D6045.

In at least one embodiment, the wax product can have an oil content of about 5 wt % or less, such as from about 0.1 wt % to about 4 wt %, such as from about 0.5 wt % to about 3 wt %, such as from about 0.75 wt % to about 2.5 wt %, such as from about 1 wt % to about 2 wt %, when determined using the testing procedure specified in ASTM D721.

In at least one embodiment, the wax product can have a density (at 60° F.) of from about 0.75 $g/cm^3$ to about 0.9 $g/cm^3$, such as from about 0.76 $g/cm^3$ to about 0.88 $g/cm^3$, such as from about 0.78 $g/cm^3$ to about 0.86 $g/cm^3$, such as from about 0.80 $g/cm^3$ to about 0.84 $g/cm^3$, such as from about 0.81 $g/cm^3$ to about 0.83 $g/cm^3$, when determined using the testing procedure specified in ASTM D1298.

In at least one embodiment, the wax product can have a viscosity (at 100° C.) of from about 2 cSt to about 25 cSt, such as from about 4 cSt to about 22 cSt, such as from about 6 cSt to about 20 cSt, such as from about 8 cSt to about 18 cSt, such as from about 10 cSt to about 16 cSt, such as from about 12 cSt to about 14 cSt, when determined using the testing procedure specified in ASTM D445.

In at least one embodiment, the wax product can have a sulfur content of about 2000 ppm or less, such as about 1500 ppm or less, such as about 1000 ppm or less, such as 500 ppm or less, such as from about 0 ppm to about 400 ppm, such as from about 20 ppm to about 300 ppm, from about 50 ppm to about 100 ppm, when determined using X-Ray Fluorescence as described below.

The n-paraffin content and non n-paraffin content of the wax product is determined by gas chromatography as described below.

In at least one embodiment, the wax product can have a n-paraffin content of from about 4 wt % to about 90 wt %, such as from about 5 wt % to about 85 wt %, such as from about 10 wt % to about 80 wt %, such as from about 15 wt % to about 75 wt %, such as from about 20 wt % to about 70 wt %, such as from about 25 wt % to about 65 wt %, such as from about 30 wt % to about 60 wt %, such as from about 35 wt % to about 55 wt %, such as from about 40 wt % to about 50 wt %, when determined using gas chromatography.

In at least one embodiment, the wax product can have an iso-paraffin content of from about 10 wt % to about 96 wt %, such as from about 15 wt % to about 95 wt %, such as from about 20 wt % to about 90 wt %, such as from about 25 wt % to about 85 wt %, such as from about 30 wt % to about 80 wt %, such as from about 35 wt % to about 75 wt %, such as from about 40 wt % to about 70 wt %, such as from about 45 wt % to about 65 wt %, such as from about 50 wt % to about 60 wt %, when determined using gas chromatography.

In at least one embodiment, the wax product can be a brightstock wax. The brightstock wax product can have a total average carbon number of from about 40 to about 60. A non-limiting example of a brightstock wax can have one or more of the following components with the components adding up to 100 wt %, or, if not adding up to 100 wt %, the balance then being made up by at least one other wax component:
  (a) a n-paraffin content of about 25 wt % or lower, such as from about 10 wt % to about 25 wt %, such as from about 11 wt %, about 12 wt %, about 13 wt %, about 14 wt %, about 15 wt %, about 16 wt %, or about 17 wt % up to about 18 wt %, about 19 wt %, about 20 wt %, about 21 wt %, about 22 wt %, about 23 wt %, or about 24 wt %, when determined using gas chromatography; and/or
  (b) a non n-paraffin content (the non n-paraffin content comprising naphthenes, iso-paraffins, and/or aromatics) of about 75 wt % or more, such as from about 75 wt % to about 90 wt %, such as from about 76 wt %, about 77 wt %, about 78 wt %, about 79 wt %, about 80 wt %, about 81 wt %, or about 82 wt % up to about 83 wt %, about 84 wt %, about 85 wt %, about 86 wt %, about 87 wt %, about 88 wt %, or about 89 wt %, when determined using gas chromatography.

In at least one embodiment, the wax product can be a high melt wax. The high melt wax product can have a total average carbon number of from about 30 to about 45. A non-limiting example of a high melt wax can have one or more of the following components with the components adding up to 100 wt %, or, if not adding up to 100 wt %, the balance then being made up by at least one other wax component:
  (a) a n-paraffin content of about 50 wt % or lower, such as from about 30 wt % to about 50 wt %, such as from about 31 wt %, about 32 wt %, about 33 wt %, about 34 wt %, about 35 wt %, about 36 wt %, about 37 wt %, about 38 wt %, about 39 wt %, or about 40 wt % up to about 41 wt %, about 42 wt %, about 43 wt %, about 44 wt %, about 45 wt %, about 46 wt %, about 47 wt %, about 48 wt %, or about 49 wt %, when determined using gas chromatography; and/or
  (b) a non n-paraffin content (the non n-paraffin content comprising naphthenes, iso-paraffins, and/or aromatics) of about 50 wt % or more, such as from about 50 wt % to about 70 wt %, such as from about 51 wt %, about 52 wt %, about 53 wt %, about 54 wt %, about 55 wt %, about 56 wt %, about 57 wt %, about 58 wt %, about 59 wt %, or about 60 wt % up to about 61 wt %, about 62 wt %, about 63 wt %, about 64 wt %, about 65 wt %, about 66 wt %, about 67 wt %, about 68 wt %, or about 69 wt %, when determined using gas chromatography.

In at least one embodiment, the wax product can be a mid melt wax. The mid melt wax product can have a total average carbon number of from about 25 to about 35. A non-limiting example of a mid melt wax can have one or more of the following components with the components adding up to 100 wt %, or, if not adding up to 100 wt %, the balance then being made up by at least one other wax component:
  (a) a n-paraffin content of about 80 wt % or lower, such as from about 55 wt % to about 80 wt %, such as from about 56 wt %, about 57 wt %, about 58 wt %, about 59 wt %, about 60 wt %, about 61 wt %, about 62 wt %, about 63 wt %, about 64 wt %, about 65 wt %, about 66 wt %, or about 67 wt % up to about 68 wt %, about 69 wt %, about 69 wt %, about 70 wt %, about 71 wt %, about 72 wt %, about 73 wt %, about 74 wt %, about 75 wt %, about 76 wt %, about 77 wt %, about 78 wt %, or about 79 wt %, when determined using gas chromatography; and/or
  (b) a non n-paraffin content (the non n-paraffin content comprising naphthenes, iso-paraffins, and/or aromatics) of about 20 wt % or more, such as from about 20 wt % to about 45 wt %, such as from about 21 wt %, about 22 wt %, about 23 wt %, about 24 wt %, about 25 wt %, about 26 wt %, about 27 wt %, about 28 wt %, about 29 wt %, about 30 wt %, about 31 wt %, or about 32 wt % up to about 33 wt %, about 34 wt %, about 35 wt %, about 36 wt %, about 37 wt %, about 38 wt %, about 39 wt %, about 40 wt %, about 41 wt %, about 42 wt % up to about 43 wt %, or about 44 wt %, when determined using gas chromatography.

In at least one embodiment, the wax product can be a low melt wax. The low melt wax product can have a total average carbon number of from about 20 to about 30. A non-limiting example of a low melt wax can have one or more of the following components with the components adding up to 100 wt %, or, if not adding up to 100 wt %, the balance then being made up by at least one other wax component:
  (a) a n-paraffin content of about 90 wt % or lower, such as from about 80 wt % to about 90 wt %, such as from about 81 wt %, about 82 wt %, about 83 wt %, about 84 wt %, or about 85 wt % up to about 86 wt %, about 87 wt %, about 88 wt %, or about 89 wt %, when determined using gas chromatography; and/or (b) a non n-paraffin content (the non n-paraffin content comprising naphthenes, iso-paraffins, and/or aromatics) of about 10 wt % or more, such as from about 10 wt % to about 20 wt %, such as from about 11 wt %, about 12 wt %, about 13 wt %, about 14 wt %, or about 15 wt % up to about 16 wt %, about 17 wt %, about 18 wt %, or about 19 wt %, when determined using gas chromatography.

Embodiments Listing

The present disclosure provides, among others, the following embodiments, each of which may be considered as optionally including any alternate embodiments.

Clause 1. A method of deoiling a feed, comprising:
introducing a waxy feed and a deoiling solvent to a dilution chilling zone, the waxy feed comprising about 70 wt % wax or more and an oil, as determined by ASTM D721;
mixing the waxy feed and the deoiling solvent in the dilution chilling zone at a temperature of from about 10° F. (about −12° C.) to about 30° F. (about −1° C.) to form a slurry;
introducing the slurry to a filter zone, the filter zone comprising one or more filter stages, wherein a temperature of the slurry is from about 40° F. (about 4.5° C.) to about 75° F. (about 24° C.);
separating the wax from the oil and the deoiling solvent to form a wax cake in a first filter stage; and
washing the wax cake in the first filter stage with the deoiling solvent to obtain a composition comprising a wax.

Clause 2. The method of Clause 1, further comprising hydrofinishing the composition comprising a wax to form a hydrofinished wax.

Clause 3. The method of Clause 1 or Clause 2, wherein a filtration rate (first stage or total filter area of the filter zone) is about 0.5 barrel/day/ft2 or more.

Clause 4. The method of any one of Clauses 1-3, wherein a volume ratio of deoiling solvent to feed is about 8.5 barrels of deoiling solvent per barrel of waxy feed or less.

Clause 5. The method of any one of Clauses 1-4, further comprising dewaxing a feed comprising:
introducing a feed and a dewaxing solvent to a dilution chilling zone; and
forming the waxy feed, wherein the dilution chilling zone for dewaxing a feed is the same or different dilution chilling zone for deoiling the waxy feed.

Clause 6. The method of any one of Clauses 1-5, wherein the waxy feed bypasses a scraped surface chiller, and/or wherein the method is free of a scraped surface chiller.

Clause 7. The method of claim any one of Clauses 1-6, wherein the waxy feed bypasses a warm-up deoiler, and/or wherein the method is free of a warm-up deoiler.

Clause 8. The method of any one of Clauses 1-7, wherein an amount of crystallization in the dilution chilling zone is about 30 vol % or more, based on a total amount of waxy feed entering the dilution chilling zone.

Clause 9. The method of any one of Clauses 1-8, wherein the dilution chilling zone is divided into about 6 or more dilution chilling stages.

Clause 10. The method of any one of Clauses 1-9, wherein the dilution chilling zone is divided into 16 dilution chilling stages, and a temperature of each dilution chilling zone is: Zone 1: about 120° F. to about 180° F.; Zone 2: about 115° F. to about 170° F.; Zone 3: about 110° F. to about 160° F.; Zone 4: about 105° F. to about 150° F.; Zone 5: about 100° F. to about 140° F.; Zone 6: about 95° F. to about 130° F.; Zone 7: about 90° F. to about 125° F.; Zone 8: about 85° F. to about 115° F.; Zone 9: about 80° F. to about 105° F.; Zone 10: about 75° F. to about 100° F.; Zone 11: about 70° F. to about 95° F.; Zone 12: about 65° F. to about 85° F.; Zone 13: about 65° F. to about 80° F.; Zone 14: about 60° F. to about 70° F.; Zone 15: about 60° F. to about 65° F.; and Zone 16: about 55° F. to about 60° F.

Clause 11. The method of any one of Clauses 1-10, wherein the slurry is formed at a temperature rate of about 8° F./min or less, such as from about 1° F./min to about 5° F./min, such as from about 2° F./min to about 4° F./min.

Clause 12. The method of any one of Clauses 1-11, wherein a liquids:solids volume ratio of the slurry is from about 10:1 to about 20:1.

Clause 13. The method of any one of Clauses 1-12, wherein a liquids:solids volume ratio of the wax cake is from about 1:1 to about 9:1.

Clause 14. The method of any one of Clauses 1-13, wherein the waxy feed enters the dilution chilling zone at a temperature above a cloud point temperature of the waxy feed, or at a temperature above a melting point temperature of the waxy feed.

Clause 15. The method of any one of Clauses 1-14, wherein the deoiling solvent comprises a low molecular weight hydrocarbon, a halogenated hydrocarbon, an aromatic compound, an aliphatic ketone, or a combination thereof.

Clause 16. The method of Clause 15, wherein:
the low molecular weight hydrocarbon is selected from the group consisting of ethane, propane, butane, propylene, and combinations thereof;
the aromatic compound is selected from the group consisting of benzene, xylene, toluene, and combinations thereof;
the halogenated hydrocarbon is selected from the group consisting of dichloromethane, dichloroethane, propylene dichloride, chlorobenzene, and combinations thereof; and
the aliphatic ketone is selected from the group consisting of acetone, methyl ethyl ketone, methyl isobutyl ketone, and combinations thereof.

Clause 17. The method of any one of Clauses 1-16, wherein the deoiling solvent comprises methyl ethyl ketone, methyl isobutyl ketone, toluene, or a combination thereof.

Clause 18. The method of any one of Clauses 1-17, wherein:
the deoiling solvent is a mixture of two solvents at a first volume ratio of from about 1:1 to about 9:1; and
the deoiling solvent is (a) a mixture of methyl ethyl ketone and methyl isobutyl ketone, or (b) a mixture of methyl ethyl ketone and toluene.

Clause 19. The method of any one of Clauses 1-18, wherein an agitation rate in at least one of the dilution chilling stages is from about 80 RPM to about 170 RPM.

Clause 20. The method of any one of Clauses 1-19, wherein the composition comprising a wax, the hydrofinished wax, or both, have one or more of the following characteristics:
a congealing point (ASTM D87 (for lower melt waxes), ASTM D938 (for higher melt waxes)) of from about 40° C. to about 90° C.;
a needle penetration (25° C., ASTM D1321) of from about 10 dmm to about 150 dmm; or a density (60° F., ASTM D1298) of from about 0.75 g/cm3 to about 0.9 g/cm3.

Clause 21. The method of any one of Clauses 1-20, wherein the composition comprising a wax, the hydrofinished wax, or both have a congealing point (ASTM D87 (for lower melt waxes), ASTM D938 (for higher melt waxes)) of from about 40° C. to about 90° C.; a needle penetration (25° C., ASTM D1321) of from about 10 dmm to about 150 dmm; and a density (60° F., ASTM D1298) of from about 0.75 g/cm3 to about 0.9 g/cm3.

Clause 22. The method of any one of Clauses 1-21, wherein the waxy feed comprises a 100N oil, a 150N oil, a 300N oil, a 600N, a 800N oil, a brightstock oil, or a combination thereof.

Clause 23. The method of any one of Clauses 1-22, wherein the waxy feed comprises a brightstock wax, the brightstock wax comprising one or more of the following components with the components adding up to 100 wt %, or, if not adding up to 100 wt %, the balance then being made up by at least one other wax component:
  a n-paraffin content of about 20 wt % or lower, as determined by gas chromatography; or
  a non n-paraffin content, the non n-paraffin content comprising naphthenes, iso-paraffins, and/or aromatics, of about 80 wt % or more, as determined by gas chromatography.

Clause 24. The method of any one of Clauses 1-23, wherein the waxy feed comprises a high melt wax, the high melt wax comprising one or more of the following components with the components adding up to 100 wt %, or, if not adding up to 100 wt %, the balance then being made up by at least one other wax component:
  a n-paraffin content of about 35 wt % or lower, as determined by gas chromatography; or
  a non n-paraffin content, the non n-paraffin content comprising naphthenes, iso-paraffins, and/or aromatics, of about 65 wt % or more, as determined by gas chromatography.

Clause 25. The method of any one of Clauses 1-24, wherein the waxy feed comprises a mid melt wax, the mid melt wax comprising one or more of the following components with the components adding up to 100 wt %, or, if not adding up to 100 wt %, the balance then being made up by at least one other wax component:
  a n-paraffin content of about 45 wt % or lower, as determined by gas chromatography; or
  a non n-paraffin content, the non n-paraffin content comprising naphthenes, iso-paraffins, and/or aromatics, of about 55 wt % or more, as determined by gas chromatography.

Clause 26. The method of any one of Clauses 1-25, wherein the waxy feed comprises a low melt wax, the low melt wax comprising one or more of the following components with the components adding up to 100 wt %, or, if not adding up to 100 wt %, the balance then being made up by at least one other wax component:
  a n-paraffin content of about 80 wt % or lower, as determined by gas chromatography; or
  a non n-paraffin content, the non n-paraffin content comprising naphthenes, iso-paraffins, and/or aromatics, of about 20 wt % or more, as determined by gas chromatography.

Clause 27. The method of any one of Clauses 1-26, wherein the waxy feed comprises about 80 wt % of wax or more, as determined by ASTM D721.

Clause 28. A method of deoiling a feed, comprising:
  dewaxing a feed, comprising:
    introducing a feed and a dewaxing solvent to a first dilution chilling zone; and
    forming a waxy feed;
  introducing the waxy feed and a deoiling solvent to a second dilution chilling zone, the waxy feed comprising a wax and an oil;
  mixing the waxy feed and the deoiling solvent in the second dilution chilling zone at a temperature of from about 10° F. (about −12° C.) to about 30° F. (about −1° C.) to form a slurry;
  introducing the slurry to a filter zone, the filter zone comprising one or more filter stages, wherein a temperature of the slurry is from about 40° F. (about 4.5° C.) to about 75° F. (about 24° C.);
  separating the wax from the oil and the deoiling solvent to form a wax cake in a first filter stage; and
  washing the wax cake in the first filter stage with the deoiling solvent to obtain a composition comprising a wax.

Clause 29. The method of Clause 28, wherein the waxy feed bypasses a scraped surface chiller prior to being introduced to the second dilution chilling zone, or wherein the method is free of a scraped surface chiller.

Clause 30. The method of Clause 28 or Clause 29, further comprising hydrofinishing the composition comprising a wax to form a hydrofinished wax.

Clause 31. The method of any one of Clauses 28-30, wherein a volume ratio of deoiling solvent to waxy feed is about 8.5 barrels of deoiling solvent per barrel of waxy feed or less.

Clause 32. The method of any one of Clauses 28-31, wherein a filtration rate (first stage or total filter area of the filter zone) is about 0.5 barrel/day/ft2 or more, such as about 1 barrel/day/ft2 or more.

Clause 33. The method of any one of Clauses 28-32, wherein an amount of crystallization in the dilution chilling zone is about 30 vol % or more, based on a total amount of waxy feed entering the dilution chilling zone.

Clause 34. The method of any one of Clauses 28-33, wherein the dilution chilling zone is divided into about 6 or more dilution chilling stages.

Clause 35. The method of any one of Clauses 28-34, wherein the dilution chilling zone is divided into 16 dilution chilling stages, and a temperature of each dilution chilling zone is: Zone 1: about 120° F. to about 180° F.; Zone 2: about 115° F. to about 170° F.; Zone 3: about 110° F. to about 160° F.; Zone 4: about 105° F. to about 150° F.; Zone 5: about 100° F. to about 140° F.; Zone 6: about 95° F. to about 130° F.; Zone 7: about 90° F. to about 125° F.; Zone 8: about 85° F. to about 115° F.; Zone 9: about 80° F. to about 105° F.; Zone 10: about 75° F. to about 100° F.; Zone 11: about 70° F. to about 95° F.; Zone 12: about 65° F. to about 85° F.; Zone 13: about 65° F. to about 80° F.; Zone 14: about 60° F. to about 70° F.; Zone 15: about 60° F. to about 65° F.; and Zone 16: about 55° F. to about 60° F.

Clause 36. The method of any one of Clauses 28-35, wherein the slurry is formed at a temperature rate of about 8° F./min or less, such as from about 1° F./min to about 5° F./min, such as from about 2° F./min to about 4° F./min.

Clause 37. The method of any one of Clauses 28-36, wherein a liquids:solids volume ratio of the slurry is from about 10:1 to about 20:1.

Clause 38. The method of any one of Clauses 28-37, wherein a liquids:solids volume ratio of the wax cake is from about 1:1 to about 9:1.

Clause 39. The method of any one of Clauses 28-38, wherein the waxy feed enters the dilution chilling zone at a temperature above a cloud point temperature of the waxy feed, or at a temperature above a melting point temperature of the waxy feed.

Clause 40. The method of any one of Clauses 28-39, wherein the deoiling solvent comprises a low molecular weight hydrocarbon, a halogenated hydrocarbon, an aromatic compound, an aliphatic ketone, or a combination thereof.

Clause 41. The method of Clause 40, wherein:
the low molecular weight hydrocarbon is selected from the group consisting of ethane, propane, butane, propylene, and combinations thereof;
the aromatic compound is selected from the group consisting of benzene, xylene, toluene, and combinations thereof;
the halogenated hydrocarbon is selected from the group consisting of dichloromethane, dichloroethane, propylene dichloride, chlorobenzene, and combinations thereof; and
the aliphatic ketone is selected from the group consisting of acetone, methyl ethyl ketone, methyl isobutyl ketone, and combinations thereof.

Clause 42. The method of any one of Clauses 28-41, wherein the deoiling solvent comprises methyl ethyl ketone, methyl isobutyl ketone, toluene, or a combination thereof.

Clause 43. The method of any one of Clauses 28-42, wherein:
the deoiling solvent is a mixture of two solvents at a first volume ratio of from about 1:1 to about 9:1; and/or
the deoiling solvent is (a) a mixture of methyl ethyl ketone and methyl isobutyl ketone, or (b) a mixture of methyl ethyl ketone and toluene.

Clause 44. The method of any one of Clauses 28-43, wherein an agitation rate in at least one of the dilution chilling stages is from about 80 RPM to about 170 RPM.

Clause 45. The method of any one of Clauses 28-44, wherein the composition comprising a wax, the hydrofinished wax, or both, have one or more of the following characteristics:
a congealing point (ASTM D87 (for lower melt waxes), ASTM D938 (for higher melt waxes)) of from about 40° C. to about 90° C.;
a needle penetration (25° C., ASTM D1321) of from about 10 dmm to about 150 dmm; or
a density (60° F., ASTM D1298) of from about 0.75 g/cm3 to about 0.9 g/cm3.

Clause 46. The method of any one of Clauses 28-45, wherein the composition comprising a wax, the hydrofinished wax, or both have a congealing point (ASTM D87 (for lower melt waxes), ASTM D938 (for higher melt waxes)) of from about 40° C. to about 90° C.; a needle penetration (25° C., ASTM D1321) of from about 10 dmm to about 150 dmm; and a density (60° F., ASTM D1298) of from about 0.75 g/cm3 to about 0.9 g/cm3.

Clause 47. The method of any one of Clauses 28-46, wherein the waxy feed comprises a 100N oil, a 150N oil, a 300N oil, a 600N, a 800N oil, a brightstock oil, or a combination thereof.

Clause 48. The method of any one of Clauses 28-47, wherein the waxy feed comprises a brightstock wax, the brightstock wax comprising one or more of the following components with the components adding up to 100 wt %, or, if not adding up to 100 wt %, the balance then being made up by at least one other wax component:
a n-paraffin content of about 20 wt % or lower, as determined by gas chromatography; or
a non n-paraffin content, the non n-paraffin content comprising naphthenes, iso-paraffins, and/or aromatics, of about 80 wt % or more, as determined by gas chromatography.

Clause 49. The method of any one of Clauses 28-48, wherein the waxy feed comprises a high melt wax, the high melt wax comprising one or more of the following components with the components adding up to 100 wt %, or, if not adding up to 100 wt %, the balance then being made up by at least one other wax component:
a n-paraffin content of about 35 wt % or lower, as determined by gas chromatography; or
a non n-paraffin content, the non n-paraffin content comprising naphthenes, iso-paraffins, and/or aromatics, of about 65 wt % or more, as determined by gas chromatography.

Clause 50. The method of any one of Clauses 28-49, wherein the waxy feed comprises a mid melt wax, the mid melt wax comprising one or more of the following components with the components adding up to 100 wt %, or, if not adding up to 100 wt %, the balance then being made up by at least one other wax component:
a n-paraffin content of about 45 wt % or lower, as determined by gas chromatography; or
a non n-paraffin content, the non n-paraffin content comprising naphthenes, iso-paraffins, and/or aromatics, of about 55 wt % or more, as determined by gas chromatography.

Clause 51. The method of any one of Clauses 28-50, wherein the waxy feed comprises a low melt wax, the low melt wax comprising one or more of the following components with the components adding up to 100 wt %, or, if not adding up to 100 wt %, the balance then being made up by at least one other wax component:
a n-paraffin content of about 80 wt % or lower, as determined by gas chromatography; or
a non n-paraffin content, the non n-paraffin content comprising naphthenes, iso-paraffins, and/or aromatics, of about 20 wt % or more, as determined by gas chromatography.

Clause 52. The method of any one of Clauses 28-51, wherein the waxy feed comprises about 70 wt % of wax or more, or about 80 wt % of wax or more, as determined by ASTM D721.

Clause 53. The method of claim any one of Clauses 28-52, wherein the waxy feed bypasses a warm-up deoiler, and/or wherein the method is free of a warm-up deoiler.

Clause 54. A method of deoiling a feed, comprising:
dewaxing a feed, comprising:
introducing a feed and a dewaxing solvent to a dilution chilling zone; and
forming a waxy feed;
introducing a deoiling solvent to the waxy feed in the dilution chilling zone, the waxy feed comprising a wax and an oil;
mixing the waxy feed and the deoiling solvent in the dilution chilling zone at a temperature of from about 10° F. (about −12° C.) to about 30° F. (about −1° C.) to form a slurry;
introducing the slurry to a filter zone, the filter zone comprising one or more filter stages, wherein a temperature of the slurry is from about 40° F. (about 4.5° C.) to about 75° F. (about 24° C.);
separating the wax from the oil and the deoiling solvent to form a wax cake in a first filter stage; and washing the wax cake in the first filter stage with the deoiling solvent to obtain a composition comprising a wax.

Clause 55. The method of Clause 54, further comprising hydrofinishing the composition comprising a wax to form a hydrofinished wax.

Clause 56. The method of Clause 54 or Clause 55, wherein a filtration rate (first stage or total filter area of the filter zone) is about 0.5 barrel/day/ft2 or more.

Clause 57. The method of any one of Clauses 54-56, wherein a volume ratio of deoiling solvent to feed is about 8.5 barrels of deoiling solvent per barrel of waxy feed or less.

Clause 58. The method of any one of Clauses 54-57, wherein the slurry is formed at a temperature rate of about 8° F./min or less, such as from about 1° F./min to about 5° F./min, such as from about 2° F./min to about 4° F./min.

Clause 59. The method of any one of Clauses 54-58, wherein a liquids:solids volume ratio of the slurry is from about 10:1 to about 20:1.

Clause 60. The method of any one of Clauses 54-59, wherein a liquids:solids volume ratio of the wax cake is from about 1:1 to about 9:1.

Clause 61. The method of any one of Clauses 54-60, wherein the waxy feed enters the dilution chilling zone at a temperature above a cloud point temperature of the waxy feed, or at a temperature above a melting point temperature of the waxy feed.

Clause 62. The method of any one of Clauses 54-61, wherein the deoiling solvent comprises a low molecular weight hydrocarbon, a halogenated hydrocarbon, an aromatic compound, an aliphatic ketone, or a combination thereof.

Clause 63. The method of Clause 62, wherein:
the low molecular weight hydrocarbon is selected from the group consisting of ethane, propane, butane, propylene, and combinations thereof;
the aromatic compound is selected from the group consisting of benzene, xylene, toluene, and combinations thereof;
the halogenated hydrocarbon is selected from the group consisting of dichloromethane, dichloroethane, propylene dichloride, chlorobenzene, and combinations thereof and
the aliphatic ketone is selected from the group consisting of acetone, methyl ethyl ketone, methyl isobutyl ketone, and combinations thereof.

Clause 64. The method of any one of Clauses 54-63, wherein the deoiling solvent comprises methyl ethyl ketone, methyl isobutyl ketone, toluene, or a combination thereof.

Clause 65. The method of any one of Clauses 54-64, wherein:
the deoiling solvent is a mixture of two solvents at a first volume ratio of from about 1:1 to about 9:1; and
the deoiling solvent is (a) a mixture of methyl ethyl ketone and methyl isobutyl ketone, or (b) a mixture of methyl ethyl ketone and toluene.

Clause 66. The method of any one of Clauses 54-65, wherein an agitation rate in at least one of the dilution chilling stages is from about 80 RPM to about 170 RPM.

Clause 67. The method of any one of Clauses 54-66, wherein the composition comprising a wax, the hydrofinished wax, or both, have one or more of the following characteristics:
a congealing point (ASTM D87 (for lower melt waxes), ASTM D938 (for higher melt waxes)) of from about 40° C. to about 90° C.;
a needle penetration (25° C., ASTM D1321) of from about 10 dmm to about 150 dmm; or
a density (60° F., ASTM D1298) of from about 0.75 g/cm3 to about 0.9 g/cm3.

Clause 68. The method of any one of Clauses 54-67, wherein the composition comprising a wax, the hydrofinished wax, or both have a congealing point (ASTM D87 (for lower melt waxes), ASTM D938 (for higher melt waxes)) of from about 40° C. to about 90° C.; a needle penetration (25° C., ASTM D1321) of from about 10 dmm to about 150 dmm; and a density (60° F., ASTM D1298) of from about 0.75 g/cm3 to about 0.9 g/cm3.

Clause 69. The method of any one of Clauses 54-68, wherein the waxy feed comprises a 100N oil, a 150N oil, a 300N oil, a 600N, a 800N oil, a brightstock oil, or a combination thereof.

Clause 70. The method of any one of Clauses 54-69, wherein the waxy feed comprises a brightstock wax, the brightstock wax comprising one or more of the following components with the components adding up to 100 wt %, or, if not adding up to 100 wt %, the balance then being made up by at least one other wax component:
a n-paraffin content of about 20 wt % or lower, as determined by gas chromatography; or
a non n-paraffin content, the non n-paraffin content comprising naphthenes, iso-paraffins, and/or aromatics, of about 80 wt % or more, as determined by gas chromatography.

Clause 71. The method of any one of Clauses 54-70, wherein the waxy feed comprises a high melt wax, the high melt wax comprising one or more of the following components with the components adding up to 100 wt %, or, if not adding up to 100 wt %, the balance then being made up by at least one other wax component:
a n-paraffin content of about 35 wt % or lower, as determined by gas chromatography; or
a non n-paraffin content, the non n-paraffin content comprising naphthenes, iso-paraffins, and/or aromatics, of about 65 wt % or more, as determined by gas chromatography.

Clause 72. The method of any one of Clauses 54-71, wherein the waxy feed comprises a mid melt wax, the mid melt wax comprising one or more of the following components with the components adding up to 100 wt %, or, if not adding up to 100 wt %, the balance then being made up by at least one other wax component:
a n-paraffin content of about 45 wt % or lower, as determined by gas chromatography; or
a non n-paraffin content, the non n-paraffin content comprising naphthenes, iso-paraffins, and/or aromatics, of about 55 wt % or more, as determined by gas chromatography.

Clause 73. The method of any one of Clauses 54-72, wherein the waxy feed comprises a low melt wax, the low melt wax comprising one or more of the following components with the components adding up to 100 wt %, or, if not adding up to 100 wt %, the balance then being made up by at least one other wax component:
a n-paraffin content of about 80 wt % or lower, as determined by gas chromatography; or
a non n-paraffin content, the non n-paraffin content comprising naphthenes, iso-paraffins, and/or aromatics, of about 20 wt % or more, as determined by gas chromatography.

Clause 74. The method of any one of Clauses 54-73, wherein the waxy feed comprises about 80 wt % of wax or more, as determined by ASTM D721.

Clause 75. A composition, comprising:
a wax having one or more of the following characteristics:
a congealing point (ASTM D87 (for lower melt waxes), ASTM D938 (for higher melt waxes)) of from about 40° C. to about 90° C.;
a needle penetration (25° C., ASTM D1321) of from about 10 dmm to about 150 dmm; or
a density (60° F., ASTM D1298) of from about 0.75 g/cm3 to about 0.9 g/cm3.

Clause 76. The composition of Clause 75, wherein the wax has a congealing point (ASTM D87 (for lower melt waxes), ASTM D938 (for higher melt waxes)) of from about 40° C. to about 90° C.; a needle penetration (25° C., ASTM D1321) of from about 10 dmm to about 150 dmm; and a density (60° F., ASTM D1298) of from about 0.75 g/cm3 to about 0.9 g/cm3.

The following examples will illustrate the processes described herein, but are not meant to limit the disclosure in any fashion.

Example

The data used for Example 1 (Ex. 1) was derived from a pilot facility using a dilution chilling crystallizer tower to directly crystalize a high melt slack wax feed and cool down to deoiling temperatures before sending the slurry directly to filtration. Comparative 1 (C1) is from a commercial plant that utilizes warm-up deoiling as an add-on to a dilution chilling dewaxer. Comparative 2 (C2) is from a plant that utilizes warm-up deoiling as an add-on to an incremental dilution dewaxer (using only scraped surface chillers as the crystallizer before deoiling). Comparative 3 (C3) is a compilation of data from the deoiling industry and is a mixture of warmup deoiling and stand-alone incremental dilution deoilers. The example and comparatives are on the same feed basis of a high melt point slack wax feed of approximately 20% to 25% oil content and derived from the production of a 600N oil.

The slack wax used in Example 1 was obtained from a commercial unit and was fully remelted (all liquid above the cloud point) prior to feeding to the pilot crystallizer.

The slack wax in Comparative 1 is from an upstream integrated dewaxer where the wax crystals were originally formed in a dilution chilling tower with a raffinate feed for the purposes of manufacturing a 600N lubricating oil and then dewaxed and filtered at a low temperature. The resulting slack wax was then fed to the deoiling section of the unit where it is "warmed up" to the desired deoiling temperature before being filtered and deoiled. The wax crystal quality of Comparative 1 is lower than the Example 1 due to, at least, the use of scraped surface chillers, the warm-up deoiling process, and the crystallization conditions within the tower itself. This is shown by the considerably lower filtration rate that has been achieved.

Comparative 2 is a deoiler in a similar configuration as the Comparative 1, except that the wax crystals were formed solely with scraped surface chillers instead of in conjunction with a dilution chilling tower. A computer simulation was performed on Comparative 2 to estimate the amount of solvent necessary to deoil the wax to the same final oil content. The computer simulation is a common tool used to estimate the necessary solvent flows in these types of units and matches well with historical data from units in operation. It is an Excel based tool that uses fundamental material balance equations to estimate the amount of solvent necessary to deoil various wax cakes of varying crystal quality.

Using this tool it can be shown that a wax cake of poorer quality requires higher amounts of solvent to reach the same final product quality.

TABLE 3

| | Ex. 1 | C1 | C2 | C3 |
|---|---|---|---|---|
| Slack wax rate (kilobarrels/day) | — | 3 | 1.6 | 1.3 |
| First Stage (barrel/day/ft²) | 7.8 | 1.3 | 0.78 | — |
| Feed Rate/Total Area barrel/day/ft²) | 6.6 | 0.8 | 0.46 | 0.57 |
| Volume ratio of solvent used to amount of feed (barrels of solvent per barrel of feed) | 6.5 | 9.7 | 11 | 8.9 |

The slack wax rates shown in the table are not normalized.

Table 3 shows the amount of wax product that can produced by the processes described herein relative to comparative data. In terms of filtration rate at a first filter stage, the process described herein (Ex. 1) can feed about 7.8 barrels of slack wax per day per square foot, which is more than about five times higher than comparative C1 and about ten times higher than C2. In terms of total available filtration area (in the Table as Feed Rate/Total Area), the data also shows that the feed filtration rate is significantly better than the industry average (C3)—showing a feed filtration rate of more than about 10 times the industry average. Feed filtration rate includes the total plant filter area—which includes one or more stages of filtration—and is a measure of the amount of wax fed to a process divided by the total available filtration area of the plant. This measurement is useful to determine how competitively and/or efficiently a given site is utilizing their available filtration area. In terms of at least feed filtration rate, the processes described herein have a significant advantage.

Table 3 also shows that the deoiling processes described herein can use significantly less solvent than conventional processes to produce wax. For example, conventional deoiling processes use at least about 8.9 barrels of solvent per barrel of feed, and even up to 11 barrels of solvent or more per barrel of feed. In contrast, the volume ratio of solvent used to the amount of feed for Example 1 is about 6.5 barrels of solvent per barrel of feed. The significantly lower amount of solvent used by the methods described herein provides substantial cost savings.

The data indicate that the processes described herein enable, at least, improved filtration rates, improved wax crystals, less solvent usage, and increased amounts of wax product over conventional processes.

The processes described herein can enable production of a fully refined wax. Additionally, the methods described herein can eliminate the use of warm-up deoiling and/or scraped surface chilling equipment while providing significantly improved wax crystals over conventional methods that use such equipment. The improvement in the quality of wax crystals by the methods described herein enables many of the above mentioned benefits of the process.

Test Methods
Gas Chromatography (GC)
Simulated distillation of petroleum distillates by gas chromatography is determined by the correlation between known boiling points and the measured retention times for a normal paraffin mixture. The retention time of an unknown sample, analyzed under the same conditions, is compared to the calibrant to determine the area percent boiling point distribution. All referenced simulated distillation methods are determined using flame ionization detection (FID) for operation at high temperatures, and produces a uniform response for most hydrocarbons. The test method requires a wide bore thin film capillary column and temperature programmable inlet. The injection system is designed to mitigate molecular weight discrimination, thermal decomposition and adsorption onto injector surfaces. The described methods are based on sample type and expected boiling point distributions.

For low melt through high melt waxes, a "wax method" is used. The wax method is based on the Paulsboro LTS method, CTS-LP0025 (Carbon Number Distribution of Waxes). Integration parameters are based on the ASTM D5442 method. This test method determines the concentrations of normal and iso-paraffins for C18 to C60 in wax samples.

For brightstock waxes, an "extended wax method" is used. The extended wax method is based on the Paulsboro LTS method, CTS-LP0025 (Carbon Number Distribution of Waxes). Integration parameters are based on the ASTM D5442 method. This test method determines the concentrations of normal and iso paraffins for C18 to C90 in wax samples.

For both the wax method and the extended wax method, the apparatus set up is as follows: Agilent 6890 gas chromatograph; HP 6890 Series autosampler; Agilent 3396 integrator; PE Nelson A/D Interface (900 series) data collection; Total Chrom for data acquisition; Zebron ZB-1XT 15 m×0.53 mm×0.15 µm capillary column; 2.1 mL/min He carrier gas, UHP (as read on instrument); constant flow; calibrant is SD-SS3E-06 (carbon range is C10-C100, marker peak is C40) available from Separation Systems, Inc.

Injection parameters for the wax method: temperature programmable inlet as injector type; initial temperature is 80° C.; initial hold time is 0 minutes; ramp is 15° C./min; final temperature is 420° C.; final hold time is 38.1 minutes; and sample size is 0.5 µL.

Injection parameters for the extended wax method: temperature programmable inlet as injector type; initial temperature is 80° C.; initial hold time is 0 minutes; ramp is 15° C./min; final temperature is 440° C.; final hold time is 32.4 minutes; and sample size is 0.5 µL.

Oven temperature programming for the wax method: initial temperature is 80° C.; initial hold time is 0 minutes; ramp rate is 6.1° C./min; final temperature is 420° C.; final hold time is 5 minutes; equilibration time is 1 min; run time is 60.7 min.

Oven temperature programming for the extended wax method: initial temperature is 80° C.; initial hold time is 0 minutes; ramp rate is 7° C./min; final temperature is 440° C.; final hold time is 5 minutes; equilibration time is 1 min; run time is 56 min.

Detector parameters for the wax method: Flame ionization detector (FID); 32 mL/min Hydrogen, UHP; air breathing quality is 320 mL/min; make-up gas is 26 mL/min; temperature is 420° C.; range is 0.

Detector parameters for the wax method: Flame ionization detector (FID); 32 mL/min Hydrogen, UHP; air breathing quality is 320 mL/min; make-up gas is 26 mL/min; temperature is 440° C.; range is 0.

Wax and viscous samples were heated before sampling to ensure a representative aliquot is obtained. The samples are diluted to a concentration of approximately 1 weight percent in $CS_2$. Samples are prepared by weighing 0.10 g±0.02 g of the wax sample into a vial, diluting with $CS_2$ (8 mL), then agitating to mix using an ultrasonic bath (if required).

X-Ray Fluorescence

This procedure covers a method for the wavelength dispersive (WD) X-ray Fluorescence (XRF) semi-quantitative analysis. The procedure employs a software package called Omnian to calculate results based on intensities recorded for each element in the sample. Apparatus includes Panalytical Axiosm$^{max}$ Sequential WD XRF, and is equipped with HI-CAP sample changer and with SuperQ Analytical software and Omnian standardless analysis software. The apparatus also includes He gas (pressure=12 psi; safety=18 psi), $N_2$ gas (pressure=68 psi; safety=70 psi), P10 gas (pressure=11 psi; safety=15 psi), and a water chiller (water temperature=52-58° F.; pump pressure=53-59 psi; filter inlet/outlet pressure=40-60 psi). Vacuum level should be less than 10 Pa. Most of the samples are run using the Mylar 3.5 µm film. The liquid samples are run using Etnom 3.0 µm. The instrument is allowed to stabilize in He gas medium for approximately 20 mins before measuring the intensities. Liquids and powders are run in He gas. Solids are run under He gas or vacuum. Omnian calibration was done on initial installation. Omnian is calibrated under vacuum, He and He with film, recalibration is not routinely required. Recalibration is event driven, e.g.: replacing the X-ray tube, deterioration of crystals, new application (tags) etc. General Reference is ASTM D7343 Standard Practice for Optimization, Sample Handling, Calibration, and Validation of X-ray Fluorescence Spectrometry Methods for Elemental Analysis of Petroleum Products and Lubricants.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

What is claimed is:

1. A method of deoiling comprising:
introducing a waxy feed and a deoiling solvent to a dilution chilling zone, the waxy feed comprising about 70 wt. % wax or more and an oil, as determined by ASTM D721;
co-currently mixing the waxy feed and the deoiling solvent in the dilution chilling zone while agitating the waxy feed and the deoiling solvent to form a slurry, wherein the agitation is sufficient to provide substantially instantaneous mixing of the waxy feed and the deoiling solvent, wherein the deoiling solvent is added in an amount such that the slurry has a liquids: solids volume ratio of from about 10:1 to about 20:1, wherein a temperature of the solvent introduced into the dilution chilling zone is from about 10° F. (about −12° C.) to about 30° F. (about −1° C.);

withdrawing the slurry from the dilution chilling zone and introducing the slurry to a filter zone while simultaneously co-currently mixing additional waxy feed and deoiling solvent in the dilution chilling zone, the filter zone comprising one or more filter stages, wherein a temperature of the slurry is from about 40° F. (about 4.5° C.) to about 75° F. (about 24° C.);

separating the wax from the oil and the deoiling solvent, by filtering the oil from the wax, to form a wax cake in a first filter stage; and washing the wax cake in the first filter stage with the deoiling solvent by spraying the wax cake with the deoiling solvent to obtain a composition comprising a wax.

2. The method of claim 1, further comprising hydrofinishing the composition comprising the wax to form a hydrofinished wax.

3. The method of claim 1, wherein a filtration rate (first stage or total filter area of the filter zone) is about 0.5 barrel/day/ft2 or more.

4. The method of claim 1, further comprising producing the waxy feed by a dewaxing process comprising:
introducing a feed and a dewaxing solvent to a dilution chilling zone; and
forming the waxy feed, wherein the dilution chilling zone for dewaxing the feed is the same or different dilution chilling zone for deoiling the waxy feed.

5. The method of claim 1, wherein the waxy feed bypasses a scraped surface chiller, and/or wherein the method is free of a scraped surface chiller.

6. The method of claim 1, wherein the waxy feed bypasses a warm-up deoiler, and/or wherein the method is free of a warm-up deoiler.

7. The method of claim 1, wherein an amount of crystallization in the dilution chilling zone is about 30 vol % or more, based on a total amount of waxy feed entering the dilution chilling zone.

8. The method of claim 1, wherein the dilution chilling zone is divided into 1 to 60 dilution chilling stages.

9. The method of claim 1, wherein the dilution chilling zone is divided into 16 dilution chilling stages, and a temperature of the slurry from each dilution chilling zone is: Zone 1: about 120° F. to about 180° F.; Zone 2: about 115° F. to about 170° F.; Zone 3: about 110° F. to about 160° F.; Zone 4: about 105° F. to about 150° F.; Zone 5:
about 100° F. to about 140° F.; Zone 6: about 95° F. to about 130° F.; Zone 7: about 90° F. to about 125° F.; Zone 8: about 85° F. to about 115° F.; Zone 9: about 80° F. to about 105° F.; Zone 10:
about 75° F. to about 100° F.; Zone 11: about 70° F. to about 95° F.; Zone 12: about 65° F. to about 85° F.; Zone 13: about 65° F. to about 80° F.; Zone 14: about 60° F. to about 70° F.; Zone 15: about 60° F. to about 65° F.; and Zone 16: about 55° F. to about 60° F.

10. The method of claim 1, wherein the slurry is formed at at an average chilling rate of about 1° F./min to about 8° F./min.

11. The method of claim 1, wherein a liquids: solids volume ratio of the wax cake is from about 1:1 to about 9:1.

12. The method of claim 1, wherein the waxy feed enters the dilution chilling zone at a temperature above a cloud point temperature of the waxy feed, or at a temperature above a melting point temperature of the waxy feed.

13. The method of claim 1, wherein the deoiling solvent comprises a low molecular weight hydrocarbon, a halogenated hydrocarbon, an aromatic compound, an aliphatic ketone, or a combination thereof.

14. The method of claim 13, wherein:
the low molecular weight hydrocarbon is selected from the group consisting of ethane, propane, butane, propylene, and combinations thereof;
the aromatic compound is selected from the group consisting of benzene, xylene, toluene, and combinations thereof;
the halogenated hydrocarbon is selected from the group consisting of dichloromethane, dichloroethane, propylene dichloride, chlorobenzene, and combinations thereof; and
the aliphatic ketone is selected from the group consisting of acetone, methyl ethyl ketone, methyl isobutyl ketone, and combinations thereof.

15. The method of claim 1, wherein the deoiling solvent comprises methyl ethyl ketone, methyl isobutyl ketone, toluene, or a combination thereof.

16. The method of claim 1, wherein:
the deoiling solvent is a mixture of two solvents at a first volume ratio of from about 1:1 to about 9:1; and
the deoiling solvent is (a) a mixture of methyl ethyl ketone and methyl isobutyl ketone, or (b) a mixture of methyl ethyl ketone and toluene.

17. The method of claim 1, wherein the dilution chilling zone comprises dilution chilling stages, and wherein an agitation rate in at least one of the dilution chilling stages is from about 80 RPM to about 170 RPM.

18. The method of claim 2, wherein the composition comprising the wax, the hydrofinished wax, or both, have one or more of the following characteristics:
a congealing point (ASTM D87 (for lower melt waxes), ASTM D938 (for higher melt waxes)) of from about 40° C. to about 90° C.;
a needle penetration (25° C., ASTM D1321) of from about 10 dmm to about 150 dmm; or a density (60° F., ASTM D1298) of from about 0.75 g/cm3 to about 0.9 g/cm3.

19. The method of claim 2, wherein the composition comprising the wax, the hydrofinished wax, or both have a congealing point (ASTM D87 (for lower melt waxes), ASTM D938 (for higher melt waxes)) of from about 40° C. to about 90° C.; a needle penetration (25° C., ASTM D1321) of from about 10 dmm to about 150 dmm; and a density (60° F., ASTM D1298) of from about 0.75 g/cm3 to about 0.9 g/cm3.

20. The method of claim 1, wherein the waxy feed comprises a 100N oil, a 150N oil, a 300N oil, a 600N, a 800N oil, a brightstock oil, or a combination thereof.

21. The method of claim 1, wherein the waxy feed comprises a brightstock wax, the brightstock wax comprising one or more of the following components with the components adding up to 100 wt %, or, if not adding up to 100 wt %, the balance then being made up by at least one other wax component:
a n-paraffin content of about 20 wt % or lower, as determined by gas chromatography; or a non n-paraffin content, the non n-paraffin content comprising naphthenes, iso-paraffins, and/or aromatics, of about 80 wt % or more, as determined by gas chromatography.

22. The method of claim 1, wherein the waxy feed comprises a high melt wax, the high melt wax comprising one or more of the following components with the components adding up to 100 wt %, or, if not adding up to 100 wt %, the balance then being made up by at least one other wax component:
- a n-paraffin content of about 35 wt % or lower, as determined by gas chromatography; or
- a non n-paraffin content, the non n-paraffin content comprising naphthenes, iso-paraffins, and/or aromatics, of about 65 wt % or more, as determined by gas chromatography.

23. The method of claim 1, wherein the waxy feed comprises a mid melt wax, the mid melt wax comprising one or more of the following components with the components adding up to 100 wt %, or, if not adding up to 100 wt %, the balance then being made up by at least one other wax component:
- a n-paraffin content of about 45 wt % or lower, as determined by gas chromatography; or
- a non n-paraffin content, the non n-paraffin content comprising naphthenes, iso-paraffins, and/or aromatics, of about 55 wt % or more, as determined by gas chromatography.

24. The method of claim 1, wherein the waxy feed comprises a low melt wax, the low melt wax comprising one or more of the following components with the components adding up to 100 wt %, or, if not adding up to 100 wt %, the balance then being made up by at least one other wax component:
- a n-paraffin content of about 80 wt % or lower, as determined by gas chromatography; or
- a non n-paraffin content, the non n-paraffin content comprising naphthenes, iso-paraffins, and/or aromatics, of about 20 wt % or more, as determined by gas chromatography.

25. The method of claim 1, wherein the waxy feed comprises about 80 wt % of wax or more, as determined by ASTM D721.

26. The method of claim 1 wherein substantially instantaneous mixing comprises complete mixing of the waxy feed and the deoiling solvent in about one second or less.

* * * * *